(12) United States Patent
Bae et al.

(10) Patent No.: US 11,735,329 B2
(45) Date of Patent: Aug. 22, 2023

(54) RADIOACTIVE CHEMICAL WASTE TREATMENT APPARATUS

(71) Applicant: KOREA ATOMIC ENERGY RESEARCH INSTITUTE, Daejeon (KR)

(72) Inventors: Sang Eun Bae, Sejong-si (KR); Hwa Kyeung Jeong, Daejeon (KR); Dong Woo Lee, Daejeon (KR); Tae Hong Park, Sejong-si (KR); Jei Won Yeon, Daejeon (KR); Kun Ho Chung, Daejeon (KR); Sang Ho Lim, Daejeon (KR); Jai Il Park, Daejeon (KR); Wan Sik Cha, Daejeon (KR); Byung Man Kang, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 251 days.

(21) Appl. No.: 17/070,120

(22) Filed: Oct. 14, 2020

(65) Prior Publication Data

US 2021/0118587 A1    Apr. 22, 2021

(30) Foreign Application Priority Data

Oct. 15, 2019  (KR) .................. 10-2019-0128001
Apr. 17, 2020  (KR) .................. 10-2020-0046862
Oct. 14, 2020  (KR) .................. 10-2020-0132880

(51) Int. Cl.
*G21F 9/12* (2006.01)
*B01J 20/28* (2006.01)
*B01J 20/02* (2006.01)

(52) U.S. Cl.
CPC ............ *G21F 9/12* (2013.01); *B01J 20/0225* (2013.01); *B01J 20/28009* (2013.01); *B01J 2220/49* (2013.01)

(58) Field of Classification Search
CPC ... G21F 9/12; B01J 20/0225; B01J 20/28009; B01J 2220/49
USPC ......................................................... 588/20
See application file for complete search history.

(56) References Cited

U.S. PATENT DOCUMENTS

| | | | |
|---|---|---|---|
| 9,966,157 | B2 | 5/2018 | Shilova et al. |
| 10,434,494 | B2 | 10/2019 | Kobayashi et al. |
| 10,449,510 | B2 | 10/2019 | Nakashima et al. |
| 2014/0042068 | A1 | 2/2014 | Namiki |
| 2015/0139870 | A1* | 5/2015 | Hasan .............. G21F 9/301 423/2 |
| 2015/0191367 | A1 | 7/2015 | Brown et al. |
| 2016/0042825 | A1 | 2/2016 | Shilova et al. |
| 2016/0247588 | A1 | 8/2016 | Kobayashi et al. |
| 2018/0029007 | A1 | 2/2018 | Kobayashi et al. |
| 2018/0071712 | A1 | 3/2018 | Nakashima et al. |
| 2018/0190404 | A1 | 7/2018 | Kobayashi et al. |

FOREIGN PATENT DOCUMENTS

| | | |
|---|---|---|
| CN | 103151088 | 6/2013 |
| CN | 103548094 | 1/2014 |
| CN | 104418400 | 3/2015 |
| CN | 107429315 | 12/2017 |
| CN | 107930580 | 4/2018 |
| EP | 2631917 | 8/2013 |
| GB | 2504097 | 1/2014 |
| JP | S57-100391 | 6/1982 |
| JP | H03-87700 | 4/1991 |
| JP | 2006-167694 | 6/2006 |
| JP | 2011-200856 | 10/2011 |
| JP | 2012-237740 | 12/2012 |
| JP | 5504368 | 5/2014 |
| JP | 2014-186028 | 10/2014 |
| JP | 2015-014594 | 1/2015 |
| JP | 2015-021856 | 2/2015 |
| JP | 5873302 | 3/2016 |
| JP | 2016-118508 | 6/2016 |

(Continued)

OTHER PUBLICATIONS

JPO, Office Action of the corresponding Japanese patent application No. 2020-174146, dated Oct. 4, 2021.
SIPO, Office Action of CN 2020111017270 dated Jul. 5, 2022.
Jakub Drnec et al., "Coadsorption of cesium and iodine on Pt(111): Structure and ionicity", Surface Science 604 (2010) 2106-2115, Sep. 8, 2010, doi:10.1016/j.susc.2010.08.026.
Maninder Kaur et al., "Conjugates of Magnetic Nanoparticle 焜Actinide Specific Chelator for Radioactive Waste Separation", Environmental science & technology 47.21 (2013): 11942-11959.
French Patent and Trademark Office, Written opinion & Search report of FR 2010539 dated Feb. 14, 2022.

(Continued)

*Primary Examiner* — Edward M Johnson
(74) *Attorney, Agent, or Firm* — Lex IP Meister, PLLC

(57) ABSTRACT

The present invention relates to a radioactive chemical waste treatment apparatus including an adsorption unit including an radioactive chemical waste adsorption member for adsorbing and separating radioactive chemical wastes from radioactive chemical waste-containing fluid, and a regeneration unit which is in fluidic communication with the adsorption unit and is for regenerating the radioactive chemical waste adsorption member by desorbing the radioactive chemical wastes from the adsorption member with the radioactive chemical wastes adsorbed thereonto, and to a radioactive chemical waste treatment method including (A) adsorbing radioactive chemical wastes onto a radioactive chemical waste adsorption member and separating the radioactive chemical wastes from a radioactive chemical waste-containing fluid, and (B) desorbing the radioactive chemical wastes from the radioactive chemical waste adsorption member with the radioactive chemical wastes adsorbed thereonto, and regenerating the radioactive chemical waste adsorption member.

10 Claims, 19 Drawing Sheets

(56) References Cited

FOREIGN PATENT DOCUMENTS

| JP | 2017-187501 | 10/2017 |
|----|---|---|
| JP | 2017-209677 | 11/2017 |
| JP | 2019-113515 | 7/2019 |
| KR | 10-2004-0065373 | 7/2004 |
| KR | 10-0968283 | 7/2010 |
| KR | 10-1523312 | 5/2015 |
| KR | 10-1636976 | 7/2016 |
| KR | 10-2017-0125597 | 11/2017 |
| KR | 10-1996976 | 7/2019 |

OTHER PUBLICATIONS

KIPO, Office Action of KR 10-2020-0132880 dated Mar. 27, 2022.
SIPO, Office Action of CN 202011101727.0 dated Jan. 20, 2023.
Shucheng Lan et al., "Activated carbon water treatment technology", Beijing, China, Environmental Science Press, pp. 48-49, Mar. 1991, First edition. Statement of relevance attached.

\* cited by examiner

S100

RADIOACTIVE CHEMICAL WASTE TREATMENT APPARATUS

CROSS-REFERENCE TO RELATED APPLICATIONS

This application claims the priority of Korean Patent Application No. 10-2019-0128001 filed on Oct. 15, 2019, Korean Patent Application No. 10-2020-0046862 filed on Apr. 17, 2020, and Korean Patent Application No. 10-2020-0132880 filed on Oct. 14, 2020 in the Korean Intellectual Property Office, the disclosure of which is incorporated herein by reference.

BACKGROUND OF THE INVENTION

Field of the Invention

The present invention relates to a radioactive chemical waste treatment apparatus and a radioactive chemical waste treatment method.

Description of the Related Art

Radioactive iodine and/or radioactive cesium are radioactive nuclides not only included in radioactive wastes containing a nuclear fuel, but also susceptible to leakage during an accident in a nuclear power plant. When a damaged nuclear fuel is generated in nuclear fuels of a nuclear power plant, soluble radioactive elements present inside the damaged nuclear fuel are dissolved into primary-system cooling water. Among these soluble elements, radioactive iodine is variously present not only as an isotope having a short half-life of several hours to about two months but also I-129 having a long half-life of about 10 million years or more, and radioactive cesium also has a very long half-life of about 30 years or more.

Such radioactive iodine and radioactive cesium have high radioactivity and high absorbance by human, and thus should be removed from inside of the cooling water. In particular, the radioactive iodine is highly volatile and is easily released into the air during a significant accident of a nuclear power plant, and therefore a system capable of collecting radioactive iodine is required.

A method using an adsorptive material, for example, a method of adsorbing radioactive iodine using a carbonaceous material such as activated carbon, silver, or platinum, is generally used as a method for collecting radioactive iodine.

In addition, a method for collecting radioactive cesium include a precipitation method, a liquid-liquid extraction method, an ion exchange method using an organic ion exchanger, a chromatography method, a method using an adsorptive material, or the like, and a method of adsorbing cesium using Prussian blue (or iron ferrocyanide) and the like is known. The Prussian blue (or iron ferrocyanide) is a hydrate of iron and has an effect of reducing the half-life of cesium, so that functions to reduce the radiation exposure caused by cesium if it is taken in a purified form at the time of cesium exposure.

As such, various researches have been carried out in order to remove radioactive iodine and/or radioactive cesium, but conventional methods have limitations in selective and high-efficient adsorption, and limitations that adsorptive materials are not reusable.

SUMMARY OF THE INVENTION

Technical Problem

The present invention is derived to solve the above-described limitations and to provide an apparatus and a method for selectively and/or highly efficiently treating radioactive chemical wastes, and a purpose of the present invention is to provide a radioactive chemical waste treatment apparatus which includes: an adsorbing unit including a radioactive chemical waste adsorption member for selectively adsorbing and removing radioactive chemical wastes from radioactive chemical waste-containing fluid (including waste water or gas); and a regeneration unit for regenerating the radioactive chemical waste adsorbing member having adsorbed radioactive chemical wastes.

In addition, another purpose of the present invention is to provide a radioactive chemical waste treatment method for selectively adsorbing radioactive chemical wastes from radioactive chemical waste-containing fluid to a radioactive chemical waste adsorption member, and removing the radioactive chemical, and regenerating the radioactive chemical waste adsorption member by desorbing the radioactive chemical wastes.

Technical Solution

An aspect of the present invention provides a radioactive chemical waste treatment apparatus including: an adsorption unit including an radioactive chemical waste adsorption member for adsorbing and separating radioactive chemical wastes from radioactive chemical waste-containing fluid; and a regeneration unit which is in fluidic communication with the adsorption unit and is for regenerating the radioactive chemical waste adsorption member by desorbing the radioactive chemical wastes from the adsorption member with the radioactive chemical wastes adsorbed thereonto.

Another aspect of the present invention provides a radioactive chemical waste treatment method including: (A) separating a radioactive chemical waste from radioactive chemical waste-containing fluid by adsorbing the radioactive chemical wastes to adsorption member; and (B) desorbing the radioactive chemical wastes from the radioactive chemical waste adsorption member with the radioactive chemical wastes adsorbed thereonto, to regenerate the radioactive chemical waste adsorption member.

Advantageous Effects

According to a radioactive chemical waste treatment apparatus and a radioactive chemical waste treatment method, radioactive chemical wastes (such as, radioactive iodine or radioactive cesium) may be selectively adsorbed with high efficiency by using a predetermined adsorbent on a radioactive chemical waste adsorption member for adsorbing and removing radioactive chemical wastes.

In addition, the present invention has an effect of being capable of selectively treating radioactive chemical wastes with high efficiency while being capable of regenerating the adsorption member unlike related adsorption members without a separate apparatus, or without replacement or addition of equipment because the radioactive chemical wastes adsorbed to the radioactive chemical waste may be desorbed from the radioactive chemical waste-adsorbed adsorption member and the radioactive chemical wastes may be recovered, regenerated and reused.

Furthermore, the radioactive chemical wastes desorbed and recovered from the radioactive chemical waste adsorption member are concentrated into a predetermined liquid and removed, and thus there is an effect of reducing the volume of the radioactive chemical wastes.

DETAILED DESCRIPTION OF THE PREFERRED EMBODIMENT

Hereinafter, the present invention will be described in detail.

1. Radioactive Chemical Waste Treatment Apparatus

The present invention provides a radioactive chemical waste treatment apparatus.

The radioactive chemical waste treatment apparatus may include: an adsorption unit including an radioactive chemical waste adsorption member for adsorbing and separating radioactive chemical wastes from radioactive chemical waste-containing fluid (including waste water and gas); and a regeneration unit which is in fluidic communication with the adsorption unit and is for regenerating the radioactive chemical waste adsorption member by desorbing the radioactive chemical waste from the adsorption member to which the radioactive chemical wastes are adsorbed.

Figure 1:
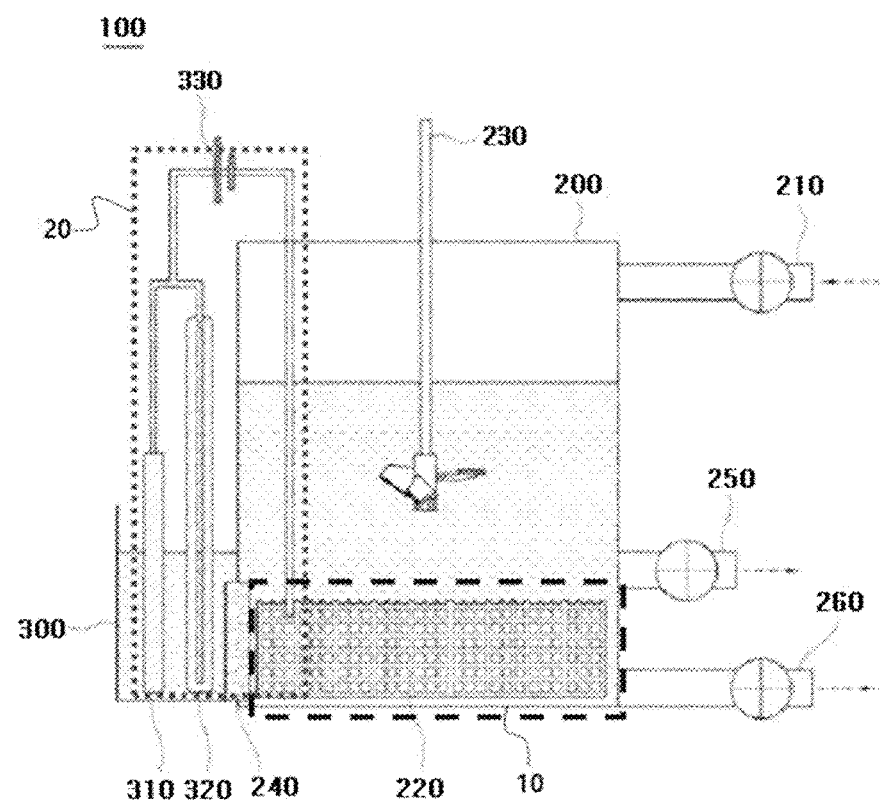
FIG. 1 is a view schematically illustrating a radioactive chemical waste treatment apparatus according to an embodiment of the present invention.

FIG. 1 is a view schematically illustrating a radioactive chemical waste treatment apparatus according to an embodiment of the present invention.

Referring to FIG. 1, a radioactive chemical waste treatment apparatus 100 according to an embodiment of the invention may include: an adsorption unit 10 including an radioactive chemical waste adsorption member 220 for adsorbing and separating radioactive chemical wastes from radioactive chemical waste-containing fluid; and a regeneration unit 20 which is in fluidic communication with the adsorption unit 10 and is for regenerating the radioactive chemical waste adsorption member by desorbing the radioactive chemical wastes from the adsorption member with the radioactive chemical wastes adsorbed thereonto.

The radioactive chemical wastes mean wastes including a radioactive decay material, is generally generated as byproducts in a nuclear reaction such as nuclear fission, but may be generated in industries having no direct relationship with the nuclear industry, and such radioactive chemical wastes may be wastes including various radioactive isotopes.

The radioactive isotopes (radioactive nuclide) may mean elements in an unstable arrangements, the elements discharge ionized radiation while decaying, and may thus be harmful to human and environments.

Specifically, the radioactive chemical wastes may be conceptually understood as including wastes containing radioactive isotopes or radioactive isotopes, or alternatively, the radioactive chemical wastes may include at least one selected from radioactive iodine or radioactive cesium.

The radioactive chemical waste-containing fluid generally means a liquid or a gas, is not necessarily a liquid or a gas, but includes all material having fluidity. Specifically, the fluid may include a waste liquid or a waste gas, and the waste liquid may include waste water, but the embodiment of the present invention is not limited thereto.

The radioactive chemical waste adsorption member 220 included in the adsorption unit 10 is a member for adsorbing radioactive chemical wastes from the radioactive chemical waste-containing fluid, and may include a supporter and an adsorbent. At this point, the adsorbent may be mixed or dispersed in the supporter, or be included in at least a portion of the surface of the supporter. A well-known method may be used as a method for mixing or dispersing the adsorbent in the supporter or as a method for forming (coating) the adsorbent on at least a portion of the surface of the supporter.

The supporter is a member for fixing the adsorbent and may have a mesh-like or nanoparticle-like shape, but the embodiment of the present invention is not limited thereto. The supporter may include at least one selected from iron, magnetite, nickel, cobalt, and an alloy thereof, or include oxide of at least one selected from iron, magnetite, nickel, cobalt, and an alloy thereof, or the like, but the embodiment of the present invention is not limited thereto.

In addition, the supporter may be magnetic. That is, the mesh-like supporter may be a magnetic mesh-like supporter, or the nanoparticle-like supporter may be a magnetic nanoparticle-like supporter.

At this point, the nanoparticle may have various particle sizes (radii or thicknesses) of about 0.1 nm to about 500 nm, and have various shapes such as shapes of plates, needles, spheres, crushed spheres, or semi-spheres, but the embodiment of the present invention is not limited thereto, and the shapes and sizes of the particles formed according to synthesizing conditions of nanoparticles may be variously changed, and a well-known method may be used such as an oxidation reduction substitution method, a hydrothermal synthesis method, a co-precipitation method, or a pyrolysis method as the synthesizing method. Also in the case of the mesh-like supporter, meshes with various dimensions may be used according to necessary condition, and the meshed have various shapes such as shapes of plates, lines, or sponge, but the embodiment of the present invention is not limited thereto.

The adsorbent is a material capable of directly adsorbing the radioactive chemical wastes, and the adsorbent may include at least one of the platinum-group metals selected from platinum (Pt), palladium (Pd), ruthenium (Ru), osmium (Os), rhodium (Rh) and iridium (Ir), among elements belonging to Groups 8, 9, and 10 in the Periodic Table and an alloy thereof.

The adsorbent may include at least one of platinum-group metals such as platinum (Pt), palladium (Pd), ruthenium (Ru), osmium (Os), rhodium (Rh), and iridium (Ir).

The adsorbent may further include Prussian blue.

When the adsorbent includes at least one of platinum metals and Prussian blue, a well-known method may be used as the method for mixing or dispersing the adsorbent in the supporter or as the method for forming (coating) the adsorbent on at least a portion of the surface of the supporter as described above.

When including at least one of platinum-group metals and an alloy thereof, the adsorbent may selectively adsorb radioactive iodine, and it is desirable to use platinum (Pt) having high selectivity among those. In addition, when including Prussian blue as the adsorbent, the adsorbent may selectively adsorb radioactive cesium. In addition, when the at least one of the platinum-group metals and an alloy thereof and Prussian blue are mixed and coated, radioactive iodine and radioactive cesium in fluid may simultaneously be adsorbed.

The adsorption is a concept including a phenomenon in which the radioactive wastes are adhered to the surface of the adsorbent, and may be understood as a concept including physical adsorption, chemical adsorption, or electrochemical adsorption (electrostatic attractive force or the like).

The radioactive chemical waste adsorption member 220 may include an adsorption member which is sintered at a temperature of about 50° C. to 900° C., then washed with at least one solution selected from a Piranha solution (for example, mixed at a ratio 3:1 of sulfuric acid to peroxide), nitric acid, sulfuric acid, and hydrochloric acid, and dealloyed. Specifically, the radioactive chemical waste adsorption member 220 may be sintered at about 200° C. to 900° C.

Before being sintered, the radioactive chemical waste adsorption member 220 may have a shape in which the adsorbent is sparsely mixed or dispersed in the supporter of the adsorption member, or the adsorbent is sparsely formed (coated) on the supporter. Subsequently, when the radioactive chemical waste adsorption member 220 is sintered, the adsorbent mixed, dispersed in or formed on the supporter are melted and aggregated, and crystallization thereof proceeds, and thus the adsorbent may be mixed, dispersed, or formed (coated) in most regions of the supporter.

In particular, when sintering the radioactive chemical waste adsorption member 220, an effect may be further improved in which the adsorbent can be prevented from being detached from the supporter in regenerating the radioactive chemical waste adsorption member.

In addition, the radioactive chemical waste treatment apparatus may further include a magnetic substrate in order to fix the radioactive chemical waste adsorption member 220 inside the adsorption unit. The magnetic substrate may be a substrate formed by sintering a magnetic body such as ferrite or an alloy, but the embodiment of the present invention is not limited thereto, and any magnetic substrate may be used without limitation as long as having magnetic property.

The regeneration unit 20 may include a desorption member which is in fluidic communication with the adsorption unit 10 and thus is for desorbing radioactive chemical wastes from the radioactive chemical waste adsorption member with the radioactive chemical wastes adsorbed thereonto while electrochemically reacting (oxidizing or reducing) with the radioactive chemical wastes.

The desorption member may include a three-electrode system in which the radioactive chemical waste adsorption member 220 serves as a working electrode.

The three-electrode system is characterized in which a reference electrode 320, a counter electrode 310, and a working electrode are disposed in an electrolyte.

The counter electrode 310 and the reference electrode 320 in the desorption member may be positioned in a second accommodation part 300, and the radioactive chemical waste adsorption member 220 may function as the working electrode and be positioned at a first accommodation part 200, and the desorption member is characterized by desorbing the radioactive chemical wastes from the radioactive chemical waste adsorption member 220. The desorption means the radioactive chemical wastes are desorbed from the adsorption member, and may be understood as a concept including all physical desorption, chemical desorption, or electrochemical desorption. For example, the desorption may include desorption of an adsorbed material or an adsorbent by being oxidized or reduced, or also include final dissociation and separation.

At this point, the desorption member may further include a potentiostat 330 in order to apply a potential to the working electrode. Specifically, the potentiostat 330 is one of electromechanical measurement apparatuses, may be operated so as to maintain the potential of the working electrode at a constant level, and electrically connect the counter electrode 310, the reference electrode 310 and the working electrode, wherein, by applying potential using the potentiostat 330, the radioactive chemical waste adsorption member 220 may function as the working electrode to desorb the radioactive chemical wastes adsorbed to the radioactive chemical waste adsorption member 220 from the adsorption member.

In addition, the regeneration unit 20 may further include a first separation membrane unit 240 for preventing inflow of the radioactive chemical wastes desorbed from the radioactive chemical waste adsorption member 220 in the adsorption unit 10.

Specifically, the first separation membrane unit 240 may be positioned between the first accommodation part 200 and the second accommodation part 300, and thus function to physically or chemically separate the first accommodation part 200 and the second accommodation part 300, or to physically or chemically separate the counter electrode 310 and the reference electrode 320 from the working electrode.

The first accommodation part 200 and the second accommodation part 300 are in fluid communication with each other, and when the first separation membrane unit 240 is not included between the first accommodation part 200 and the second accommodation part 300, the radioactive chemical wastes separated from the working electrode may flow and be adsorbed into the second accommodation part including the counter electrode 310 and the reference electrode 320, and therefore a problem of contamination of the counter electrode 310 and the reference electrode 320 may be caused.

Accordingly, the regeneration unit 20 may include the first separation membrane unit 240 between the first accommodation part 200 and the second accommodation part 300 and thus may prevent impurities contained in radioactive chemical waste-containing fluid from moving toward the regeneration unit 20, and prevent radioactive iodine or radioactive cesium, which are radioactive chemical wastes contained in radioactive chemical waste concentrated fluid, from flowing and adsorbing to the counter electrode 310 and the reference electrode 320.

At this point, there is no limitation in the shape, material, and/or type of the separation membrane included in the first separation membrane unit 240, and as long as it is disposed between the first accommodation part 200 and the second accommodation part 300 and can prevent the movement of iodine ions or cesium ions and the movement of impurities, the separation membrane may be used without limitation.

The radioactive chemical waste treatment apparatus may further include a fluid inflow part 210 formed so that radioactive chemical waste-containing fluid flows into the adsorption unit 10; a treated fluid discharge part 250 for discharging treated fluid from which the radioactive chemical wastes are removed by the radioactive chemical waste adsorption member 220; and a concentrated fluid discharge part 260 for discharging radioactive chemical waste concentrated fluid containing the radioactive chemical wastes desorbed from the radioactive chemical waste adsorption member 220.

At this point, the fluid inflow part 210, the treated fluid discharge part 250, and/or the concentrated fluid discharge part 260 may each further include a pump or a valve, and thus may adjust a flow rate, flow pressure, or the like or prevent a reverse flow of a fluid in each of members.

In addition, radioactive chemical waste treatment apparatus may include the first accommodation part 200 for accommodating the adsorption unit 10, and specifically, the fluid inflow part 210 may be positioned on an upper portion (with respect to the gravitational direction) of one side of the first accommodation part 200, so that the radioactive chemical waste-containing fluid may flow through the fluid inflow part 210 into the first accommodation part 200.

The first accommodation part 200 may further include a stirrer 230. Specifically, the stirrer 230 stirs the fluid in the first accommodation part 200 while the radioactive chemical waste adsorption member 220 adsorbs the radioactive chemical wastes from the radioactive chemical waste-containing fluid accommodated in the first accommodation part 200, and thus may enhance the adsorption efficiency by facilitating the contact between the radioactive chemical waste adsorption member 220 and the radioactive chemical wastes in the fluid.

The treated fluid discharge part 250 is for discharging treated fluid from which radioactive chemical wastes are removed by completely adsorbed to the radioactive chemical waste adsorption member 220 in the adsorption unit 10, and may be positioned on one side of the first accommodation part 200, and specifically, positioned lower (with respect to the gravitational direction) than the fluid inflow part 210, and positioned on an upper portion (with respect to the gravitational direction) of the radioactive chemical waste adsorption member 220 of the adsorption unit 10 or higher (with respect to the gravitational direction) than the radioactive chemical waste adsorption member 220.

When the treated fluid discharge part 250 is positioned on an upper portion of the radioactive chemical waste adsorption member 220 or higher than the radioactive chemical waste adsorption member 220, the treated fluid can be discharged or be easily discharged only in the extent that the radioactive chemical waste adsorption member 220 is immersed in order to use the treated fluid as an electrolyte when the radioactive chemical waste adsorption member 220 is used as a working electrode in a three-electrode system of a regeneration unit.

The concentrated fluid discharge part 260 is for discharging the radioactive chemical waste concentrated fluid in which are concentrated the radioactive chemical wastes, desorbed from the radioactive chemical waste adsorption member 220, and the concentrated fluid discharge part 260 may be positioned on one side of the first accommodation part 200, and specifically, be positioned on a lower portion of one side of the first accommodation part 200. More specifically, the concentrated fluid discharge part 260 may be positioned on the bottom portion of the first accommodation part 200. As such, when the concentrated fluid discharge part 260 is positioned on a lower portion of one side of the first accommodation part 200, or on the bottom portion of the first accommodation part 200, the generated concentrated fluid may be completely discharged from the first accommodation part 200.

That is, the fluid inflow part 210, the treated fluid discharge part 250, and the concentrated fluid discharge part 260 may be disposed on one side of the first accommodation part 200, that is, on the same side, but should not necessarily be on the same side, and the fluid inflow part 210, the treated fluid discharge part 250, and the concentrated fluid discharge part 260 may also be disposed on the mutually different sides.

Figure 2:
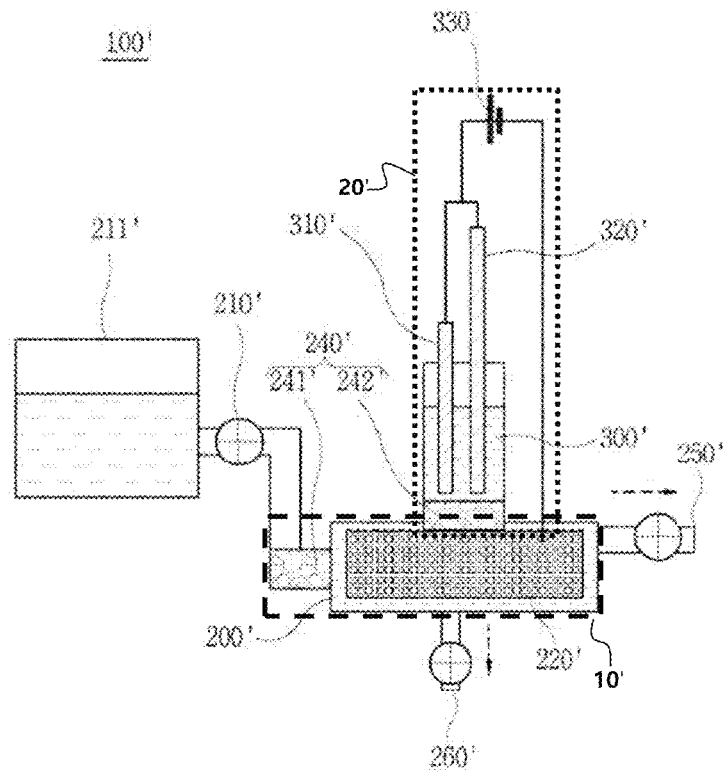
FIG. 2 is a view schematically illustrating a radioactive chemical waste treatment apparatus according to another embodiment of the present invention.

FIG. 2 is a view schematically illustrating a radioactive chemical waste treatment apparatus according to an embodiment of the present invention. In an embodiment described in FIG. 2, the same or similar reference numeral is applied to the components having the same as or similar to the embodiment described in FIG. 1, and the description thereon may be replaced with the above-described contents.

Referring to FIG. 2, a radioactive chemical waste treatment apparatus 100' according to an embodiment of the present invention may include: an adsorption unit 10' including an radioactive chemical waste adsorption member 220' for adsorbing and separating radioactive chemical wastes from radioactive chemical waste-containing fluid; and a regeneration unit 20' which is in fluidic communication with the adsorption unit 10' and is for regenerating the radioactive chemical waste adsorption member by desorbing the radioactive chemical wastes from the adsorption member with the radioactive chemical wastes adsorbed thereonto.

The above-described contents on the radioactive chemical wastes, the radioactive chemical waste adsorption member 220, the adsorption unit 10, the regeneration unit 20, the fluid inflow part 210, the treated fluid discharge part 250, and the concentrated fluid discharge part 260 may be applied the same to the radioactive chemical wastes, the radioactive chemical waste adsorption member 220', the adsorption unit 10', the regeneration unit 20', a fluid inflow part 210', a treated fluid discharge part 250', and a concentrated fluid discharge part 260'.

According to FIG. 2, the radioactive chemical waste treatment apparatus 100' may further include a fluid storage part 211' for accommodating the radioactive chemical waste-containing fluid. The fluid storage part 211' is in fluidic communication with the fluid inflow part 210' and be in fluidic communication with up to the first accommodation part 200' via the fluid inflow part 210'. That is, when a certain amount of the radioactive chemical waste-containing fluid is stored in the fluid storage part 211', the radioactive chemical waste-containing water may be injected into the first accommodation part 200' by controlling a pump or a valve of the fluid inflow part 210'.

At this point, the adsorption unit 10' may further include a second separation membrane unit 241' for preventing the inflow of contaminants (or impurities) in the radioactive chemical waste-containing fluid. The second separation membrane unit 241' may be positioned between the fluid inflow part 210' and the first accommodation part 200'. Accordingly, filtering may be performed so that contaminants (impurities) contained in the radioactive chemical waste-containing fluid do not flow into the first accommodation part 200'. In addition, while the radioactive chemical waste-containing fluid passes, the fluid is stirred and a turbulent flow may naturally be formed.

The above-described formation of a turbulent flow may function like the stirrer 230 illustrated in FIG. 1, and while the radioactive chemical waste-containing fluid flows into the first accommodation part 200' through the second separation membrane unit 241' while forming a turbulent flow passes, so that radioactive chemical wastes may be easily adsorbed to the radioactive chemical waste adsorption member 220' even without separately providing a stirrer in the first accommodation part 200'.

In addition, the radioactive chemical waste treatment apparatus 100' may further include a treated fluid storage part (not shown) which may store the treated fluid from which the radioactive chemical wastes are removed by the radioactive chemical waste adsorption member 220'. The treated fluid storage part may be connected to and in liquid communication with the treated fluid discharge part 250'.

In addition, the radioactive chemical waste treatment apparatus 100' may further include a concentrated fluid storage part (not shown) which may store the radioactive chemical waste concentrated fluid containing the radioactive chemical wastes desorbed from the radioactive chemical waste adsorption member 220'. The concentrated fluid storage part may be connected to and in liquid communication with the concentrated fluid discharge part 260'.

The recovery unit 20' may further include a first separation membrane unit 242' for preventing inflow of the radioactive chemical wastes desorbed from the radioactive chemical waste adsorption member 220' in the adsorption unit 10'.

Specifically, the first separation membrane unit 242' may be positioned between the first accommodation part 200' and the second accommodation part 300', and function to physically or chemically separate the first accommodation part 200' and the second accommodation part 300', or to physically or chemically separate the counter electrode 310', the reference electrode 320' and the working electrode.

2. Radioactive Chemical Waste Treatment Method

The present invention provides a radioactive chemical waste treatment method.

The radioactive chemical waste treatment method may include: (A) adsorbing onto a radioactive chemical waste adsorption member and separating the radioactive chemical wastes from a radioactive chemical waste-containing fluid (including waste water or gas); and (B) desorbing the radioactive chemical wastes from the radioactive chemical waste adsorption member with the radioactive chemical wastes adsorbed thereonto, and regenerating the radioactive chemical waste adsorption member.

Figure 3:
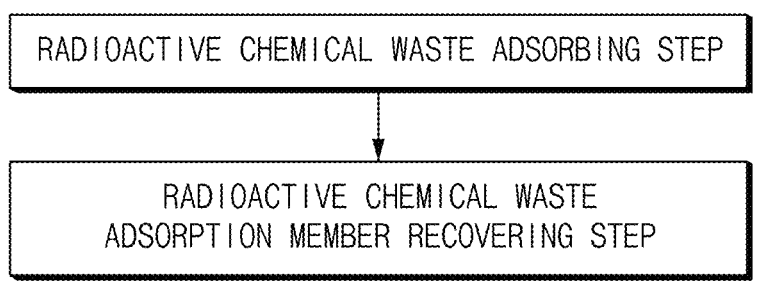
FIG. 3 is a flowchart schematically illustrating a radioactive chemical waste treatment method according to an embodiment of the present invention.

FIG. 3 is a flowchart schematically illustrating a radioactive chemical waste treatment method according to an embodiment of the present invention.

Step (A) is a step for adsorbing and separating radioactive chemical wastes from radioactive chemical waste-containing fluid using the radioactive chemical waste adsorption member, so that the radioactive chemical waste adsorption member contains an adsorbent capable of selectively adsorbing the radioactive chemical wastes and the radioactive chemical wastes contained in the fluid are adsorbed to the adsorbent and separated.

The radioactive chemical waste adsorption member may include a supporter and an adsorbent, and the adsorbent may be mixed or dispersed in the supporter, or be contained in at least a portion of the surface of the supporter. Well-known methods may be used for the method for manufacturing the radioactive chemical waste adsorption member, that is, a method for mixing or dispersing the adsorbent in the supporter or a method for forming (coating) the adsorbent on at least a portion of the surface of the supporter.

Specifically, the radioactive chemical wastes may contain at least one among radioactive iodine or radioactive cesium.

When including at least one of platinum-group metals and an alloy thereof, the adsorbent may selectively adsorb radioactive iodine, and it is desirable to use platinum (Pt) having high selectivity among those. In addition, when including Prussian blue, the adsorbent may selectively adsorb radioactive cesium. In addition, when at least one of the platinum-group metals and an alloy thereof and Prussian blue are mixed and coated, radioactive iodine and radioactive cesium in fluid may simultaneously be adsorbed.

In addition, the radioactive chemical waste adsorption member may include an adsorption member which is sintered at a temperature of about 50° C. to 900° C., is then washed with at least one solution selected from a Piranha solution (for example, mixed at a ratio about 3:1 of sulfuric acid to peroxide), nitric acid, sulfuric acid, or hydrochloric acid, and is then dealloyed.

Before sintering the radioactive chemical waste adsorption member, radioactive chemical waste adsorption member may have a shape in which the adsorbent is sparsely mixed or dispersed in the supporter of the adsorption member, or the adsorbent is sparsely formed (coated) on the supporter of the adsorption member. Subsequently, the radioactive chemical waste adsorption member is sintered and dealloyed, so that there is an effect in that the adsorption efficiency may be enhanced by improving the stability of the radioactive chemical waste adsorption member and increasing the adsorption area of the radioactive chemical wastes, and the adsorbents are prevented from being detached from the supporter while the radioactive chemical waste adsorption member is regenerated.

The radioactive chemical waste adsorption member may be fixed to a magnetic substrate in step (A). The magnetic substrate may be a substrate formed by sintering a magnetic body such as ferrite or an alloy, but the embodiment of the present invention is not limited thereto, and the magnetic substrate may be used without limit as long as having magnetism.

The above-described contents may be applied the same to other matters regarding radioactive chemical wastes, the radioactive chemical waste adsorption member, the supporter, and the adsorbent.

Step (A) above includes bringing the radioactive chemical waste-containing fluid into contact with the radioactive chemical waste adsorption member and, specifically, the radioactive chemical waste-containing fluid may be directly injected from a pipe (fluid inflow part) through which the radioactive chemical waste-containing fluid flows, or be injected from a storage tank (fluid storage part) which stores the radioactive chemical waste-containing fluid, into an accommodation tank (first accommodation part) which stores the radioactive chemical waste adsorption member is accommodated.

In an embodiment of the present invention, when the radioactive chemical waste treatment apparatus 100 as illustrated in FIG. 1 is used to adsorb and separate radioactive chemical wastes, a certain amount of the radioactive chemical waste-containing fluid is poured into a first storage part 200, and then an adsorption reaction may be performed while stirring the fluid in the first accommodation part 200 using a stirrer 230.

By stirring the radioactive chemical waste-containing fluid, contact between the radioactive chemical waste adsorption member and the radioactive chemical waste in the fluid may be assisted while performing step (A) above, and thus, the adsorption efficiency may be efficiently enhanced.

In another embodiment of the present invention, when the radioactive chemical waste treatment apparatus 100 as illustrated in FIG. 2 is used to adsorb and separate radioactive chemical wastes, the radioactive chemical waste-containing fluid may flow from a fluid storage part 211' storing the fluid into a first accommodation part 200' via a second separation membrane unit 241'. At this point, the radioactive chemical waste-containing fluid passes through the second separation membrane unit 241' and thus forms a turbulent flow, and flows into the first accommodation part 200' to exhibit an effect like the stirrer 230 illustrated in FIG. 1 and thereby may facilitate the adsorption of the radioactive chemical wastes in the radioactive chemical waste adsorption member and in the fluid.

Step (B) above is a step for desorbing the radioactive chemical wastes from the radioactive chemical waste adsorption member with the radioactive chemical wastes adsorbed thereonto and regenerating the radioactive chemical waste adsorption member and step (B) may specifically include desorbing the radioactive chemical wastes while radioactive chemical wastes electrochemically react, by a three-electrode system using the radioactive chemical waste adsorption member as a working electrode.

Step (B) above may include applying a potential to the working electrode using a potentiostat, and may also include maintaining the potential of the working electrode at a constant level. The radioactive chemical wastes adsorbed to the radioactive chemical waste adsorption member may be desorbed by applying a potential to the working electrode.

The desorbed radioactive chemical wastes may be dissolved in a small amount of solvent. Accordingly, the radioactive chemical wastes are concentrated in a small amount of solvent, so that the volume of the radioactive chemical wastes may be remarkably reduced, and the radioactive chemical waste adsorption member may be reused by desorbing and separating the radioactive chemical wastes from the radioactive chemical wastes adsorption member.

The solvent may include a portion of treated fluid from which the radioactive chemical wastes having been adsorbed to the radioactive chemical waste adsorption member was removed. Alternatively, the solvent may include a new electrolytic solution including water containing non-radioactive ions after all the treated fluid is discharged from the first accommodation part.

Step (B) above may include separating the radioactive chemical waste adsorption member from a magnetic substrate to which is fixed the radioactive chemical waste adsorption member from which the radioactive chemical wastes have been desorbed. As described above, the radioactive chemical waste adsorption member is separated from the magnetic substrate to which is fixed the radioactive chemical waste adsorption member, so that the radioactive chemical waste adsorption member may be completely detached from the radioactive chemical waste treatment apparatus and be reused.

A well-known method for removing magnetism from the magnetic substrate may be used for the method for separating the radioactive chemical waste adsorption member from the magnetic substrate.

In addition, the radioactive chemical waste treatment method may include monitoring for measuring an open circuit potential determined by the working electrode, the counter electrode, and the reference electrode in the three-electrode system.

Specifically, the concentration of the radioactive chemical wastes contained in the apparatus used for the radioactive chemical waste treatment method is measured and monitored, and in the monitoring, the concentration of the radioactive chemical wastes may be checked by measuring the potential in real time using the three-electrode system.

The radioactive chemical waste treatment method may include determining whether to perform step (A) and/or step (B) above according to the potential value measured as such.

That is, the radioactive chemical waste treatment method may include, while including monitoring for measuring an open circuit potential determined by the working electrode, the counter electrode, and the reference electrode in the three-electrode system, determining whether to perform step (A) and/or step (B) above according to the measured potential value.

More specifically, in the monitoring, the concentration of the radioactive chemical wastes may be checked by using the radioactive chemical waste adsorption member as the working electrode, and measuring the open circuit potential in real time using a potentiostat, and the monitoring may include determining whether to perform each step according to the measured potential value.

That is, the concentration of the radioactive chemical wastes may be measured and evaluated, so that the radioactive chemical wastes in the radioactive chemical waste-containing fluid may be completely removed and discharged, and the performance of the radioactive chemical waste adsorption member is checked in real time, so that when the radioactive chemical wastes exceed an adsorption capacity, the radioactive chemical wastes are desorbed (or dissociated) from the radioactive chemical waste adsorption member, so that the radioactive chemical waste adsorption member may be regenerated and reused.

Furthermore, a radioactive chemical waste treatment apparatus including the radioactive chemical waste adsorption member is installed in a cooling system inside a nuclear power plant, so that monitoring and adsorption and separation of the radioactive chemical wastes may be performed.

That is, a radioactive chemical waste adsorption member is installed in a cooling system inside a nuclear power plant, and an electrode system is formed outside and monitoring is performed, so that outflow of the radioactive chemical wastes may be prevented by adsorbing the radioactive chemical wastes present in the cooling system, and a serious accident may be prevented in advance by detecting the outflow of the radioactive chemical wastes.

In addition, the potential of the radioactive chemical waste adsorption member is measured in real time, so that when the radioactive chemical waste adsorption member installed in the cooling system may not perform any more adsorption function (when exceeding an adsorption capacity), the radioactive chemical wastes adsorbed to the radioactive chemical waste adsorption member is desorbed, dissociated, and removed, so that the installed radioactive chemical waste adsorption member may be reused without replacement thereof.

Hereinafter, examples and experimental examples will be described in detail to help understand the present invention. However, the examples and experimental examples below are illustrated merely for help understand the present invention, and the present invention is not limited only to the examples and experimental examples below.

Manufacturing Example 1. Manufacturing of Platinum-Coated Ferrous Magnetic Nanoparticles Coated (Fe@Pt)

1) In order to manufacture a radioactive chemical waste adsorption member, magnetic nanoparticle powder containing iron was prepared using iron chloride and sodium borohydride. Subsequently, potassium chloroplatinate was added to the prepared magnetic nanoparticles to prepare platinum-coated ferrous magnetic nanoparticles.

2) Subsequently, in order to enhance the stability of the prepared nanoparticles, the nanoparticles were sintered at about 50° C. to 900° C. in a high-temperature furnace under a hydrogen gaseous atmosphere. The sintered nanoparticles were washed and dealloyed in a Piranha solution (sulfuric acid:peroxide=3:1) to prepare a ferrous magnetic nanoparticle adsorption member (Fe@Pt).

Figure 4:
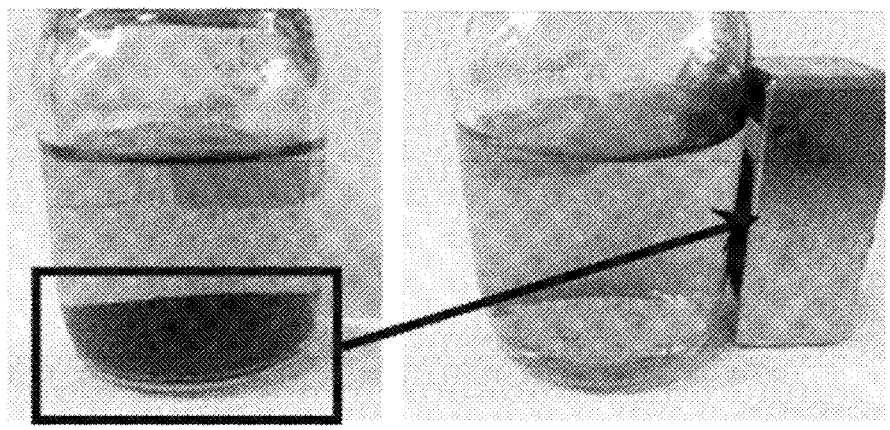
FIG. 4 is an image after synthesizing an Fe@Pt adsorption member of manufacturing example 1.
Figure 5:
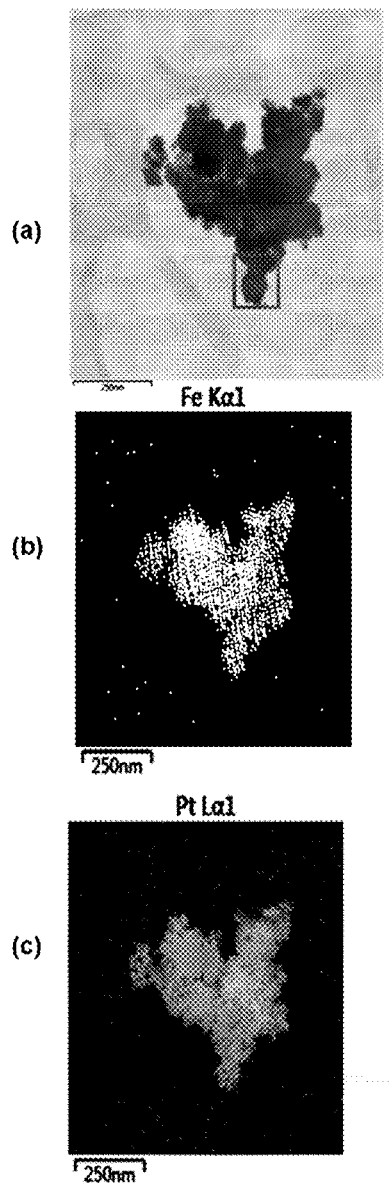
FIG. 5 is a view illustrating a TEM image and an EDS measurement result on the Fe@Pt adsorption member of manufacturing example 1.

An image after synthesizing the Fe@Pt adsorption member of manufacturing example 1 is illustrated in FIG. 4, and a transmission electron microscope (TEM) image (a) of the Fe@Pt adsorption member of manufacturing example 1 and energy dispersive X-ray spectroscopy (EDS) measurement results (b) and (c) are illustrated in FIG. 5.

According to FIG. 4, it could be confirmed that a magnet was brought close to the adsorption member of manufacturing example 1 and the adsorbent was attracted and adhered to the magnet. Accordingly, it could be confirmed that an adsorption member including magnetic nanoparticles as supporters was synthesized.

According to FIG. 5, it could be confirmed through a TEM image that the adsorption member of manufacturing example 1 was synthesized. In addition, it could be confirmed from the EDS measurement results that iron and platinum were contained in the synthesized adsorption member, and thus it could be confirmed that a Fe@Pt radioactive chemical waste adsorption member was manufactured.

Manufacturing Example 2. Manufacturing of Platinum-Coated Nickel Magnetic Nanoparticles (Ni@Pt)

Except for using nickel chloride instead of iron chloride in manufacturing example 1-1), manufacturing was performed in the same manner as manufacturing example 1-1) and a platinum-coated nickel magnetic nanoparticle adsorption member (Ni@Pt) was manufactured.

Figure 6:
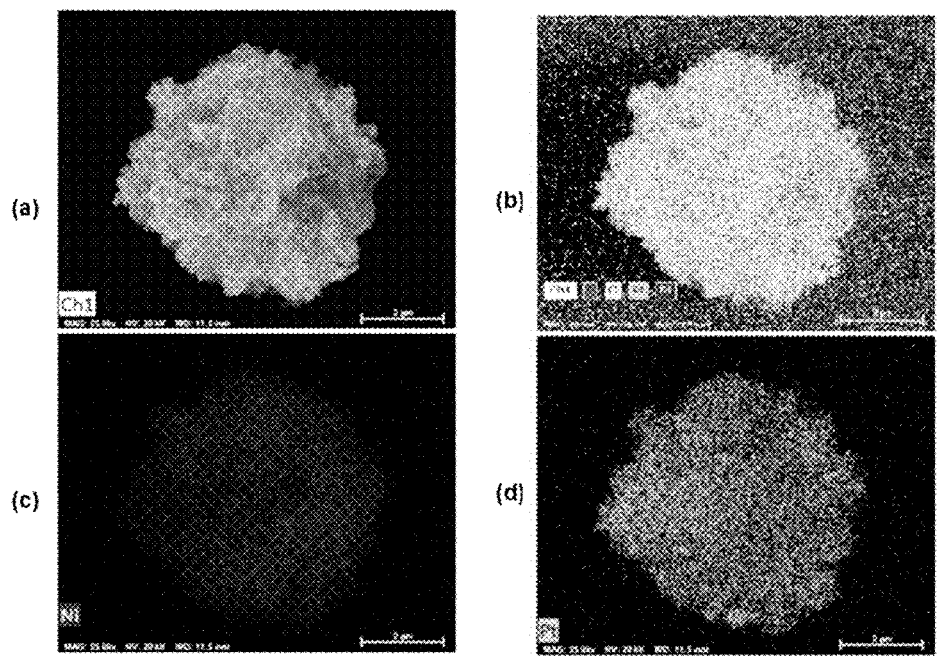
FIG. 6 is a view illustrating an SEM image and an EDS measurement result on the Ni@Pt adsorption member of manufacturing example 2.

A scanning microscope (SEM) image (a) of the Ni@Pt adsorption member of manufacturing example 2 and EDS measurement results (b) and (c) are illustrated in FIG. 6.

According to FIG. 6, it could be confirmed through a SEM image that the adsorption member of manufacturing example 2 was synthesized. In addition, it could be confirmed from the EDS measurement results that nickel and platinum were contained in the synthesized adsorption member, and thus it could be confirmed that a Ni@Pt radioactive chemical waste adsorption member was manufactured.

Manufacturing Example 3. Manufacturing of Platinum-Coated Cobalt Magnetic Nanoparticles (Co@Pt)

Except for using cobalt chloride instead of iron chloride in manufacturing example 1-1), manufacturing was performed in the same manner as manufacturing example 1-1) and a platinum-coated cobalt magnetic nanoparticle adsorption member (Co@Pt) was manufactured.

Manufacturing Example 4. Manufacturing of Palladium-Coated Ferrous Magnetic Nanoparticles (Fe@Pd)

Except for using palladium chloride (II) instead of potassium chloroplatinate in manufacturing example 1-1), manufacturing was performed in the same manner as manufacturing example 1-1) and a palladium-coated ferrous magnetic nanoparticle adsorption member (Fe@Pd) was manufactured.

Manufacturing Example 5. Manufacturing of Platinum and Prussian Blue-Coated Nickel Magnetic Nanoparticles (Ni@PB/Pt)

In order to manufacture a radioactive chemical waste adsorption member that simultaneously adsorbed radioactive iodine and radioactive cesium, potassium chloroplatinate was added to nickel nanoparticles and was allowed to react, and then Prussian blue (potassium ferrocyanide, $K_4Fe(CN)_6$; 'PB') was further added to the reaction product and allowed to react at the room temperature to manufacture a platinum and Prussian blue-coated nickel magnetic nanoparticle adsorption member (Ni@PB/pt) was manufactured.

Figure 7:
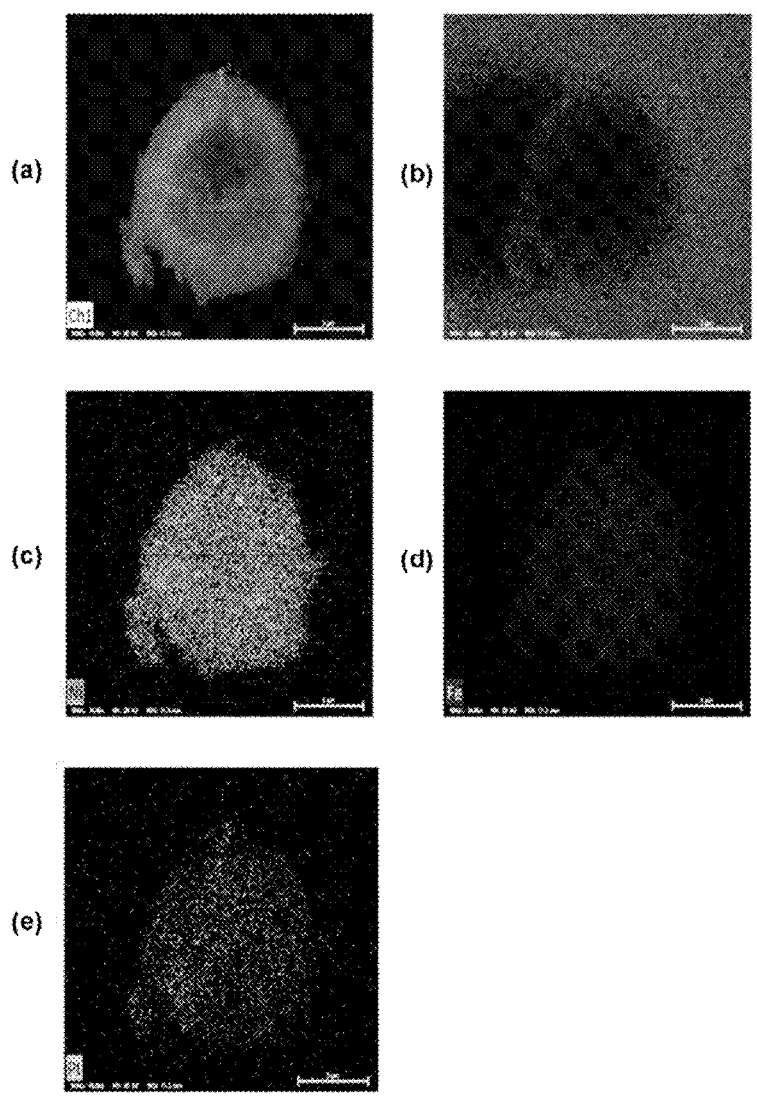
FIG. 7 is a view illustrating an SEM image and an EDS measurement result on the Ni@PB/Pt adsorption member of manufacturing example 5.

A scanning electron microscope (SEM) image (a) of the Ni@PB/Pt adsorption member of manufacturing example 5 and EDS measurement results (c), (d) and (e) are illustrated in FIG. 7.

According to FIG. 7, it could be confirmed through a SEM image that the adsorption member of manufacturing example 5 was synthesized. In addition, it could be confirmed from the EDS measurement results that iron and platinum were contained in the synthesized adsorption member, and thus it could be confirmed that a Ni@PB/Pt radioactive chemical waste adsorption member was manufactured.

Experimental Example 1. Before/after Sintering Measurement of Fe@Pt Adsorption Member FIG. 8 illustrates a TEM image of the Fe@Pt adsorption member of manufacturing example 1 before (a)/after (b) sintering, and FIG. 9 illustrates XRD (X-ray Diffraction) measurement results according to sintering temperatures.

Figure 8:
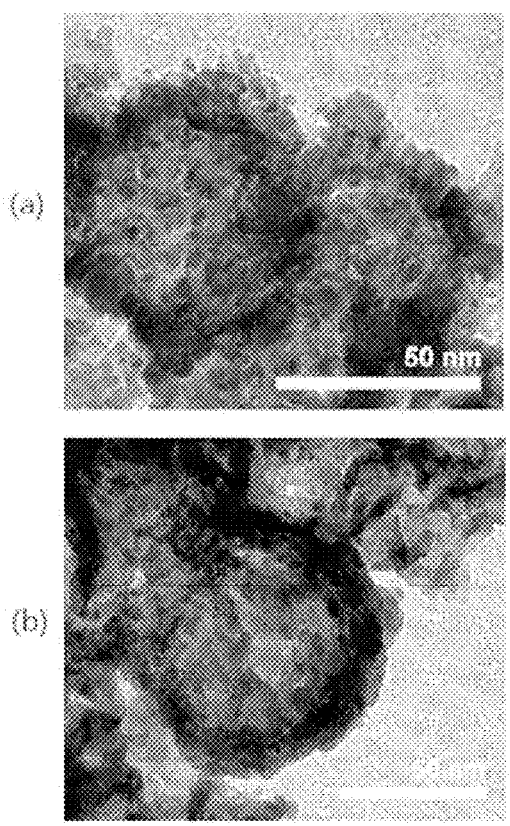
FIG. 8 is a view illustrating a TEM image before (a) and after (b) sintering of an Fe@Pt adsorption member according to experimental example 1.

According to FIG. 8, it could be confirmed that platinum was coated on the surfaces of magnetic nanoparticles before sintering (a) of the adsorption member of manufacturing example 1, and it could be confirmed that platinum was melted and mutually combined, and crystallization progressed after sintering (b). That is, according to FIG. 8, it could be confirmed that the radioactive chemical waste adsorption member was sintered.

Figure 9:
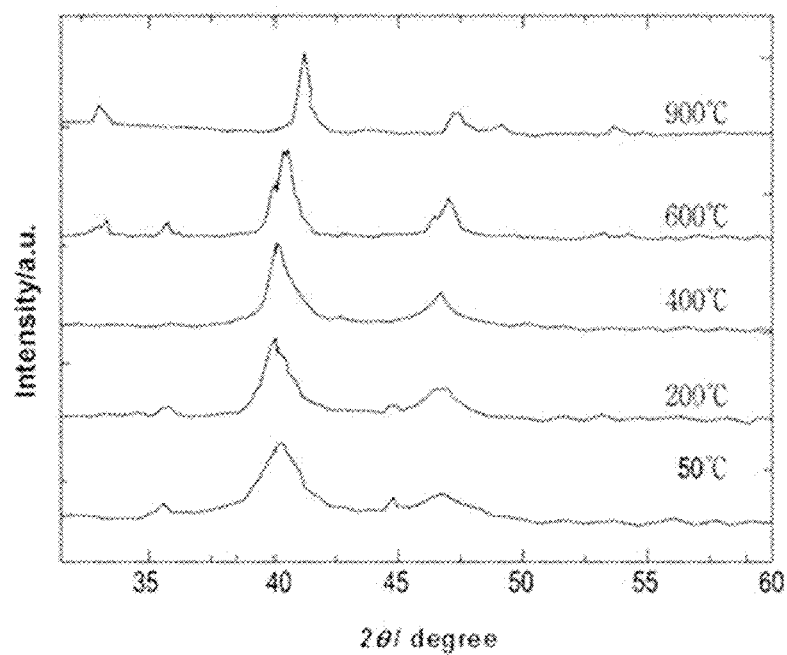
FIG. 9 is a view illustrating an XRD measurement result according to sintering temperatures of the Fe@Pt adsorption member according to experimental example 1.

According to FIG. 9, it could be confirmed that crystallizability varied according to an increase in the sintering temperature.

Experimental Example 2. XRD Measurements of Adsorption Members of Manufacturing Examples 1, 2, 4 and 5

FIGS. 10 to 13 respectively illustrate the XRD measurement results on the adsorption members which are obtained by sintering, at a temperature about 200° C., the Fe@Pt adsorption member (sintered at about 200° C.) of manufacturing example 1, the Ni@Pt adsorption member of manufacturing example 2, the Fe@Pd adsorption member of manufacturing example 4, and the Ni@PB/Pt adsorption member of manufacturing example 5.

Figure 10:
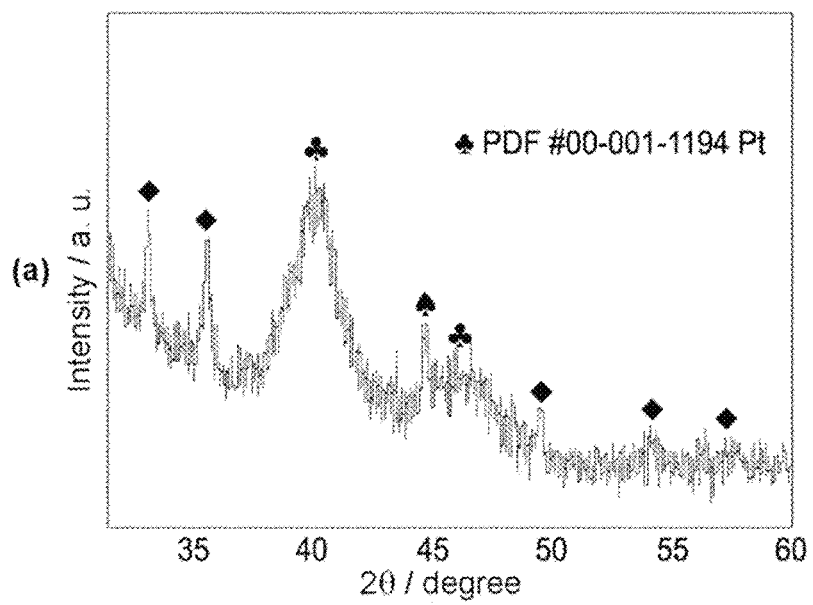
FIG. 10 is a view illustrating an XRD measurement result of the Fe@Pt adsorption member of manufacturing example 1 according to experimental example 2.

According to FIG. 10, peaks of iron, iron oxide, and platinum could be confirmed from the XRD measurement results on the Fe@Pt adsorption member, and thus, it could be confirmed that the Fe@Pt or $Fe_2O_3$@Pt adsorption member coated with platinum on the surface thereof was manufactured.

Figure 11:
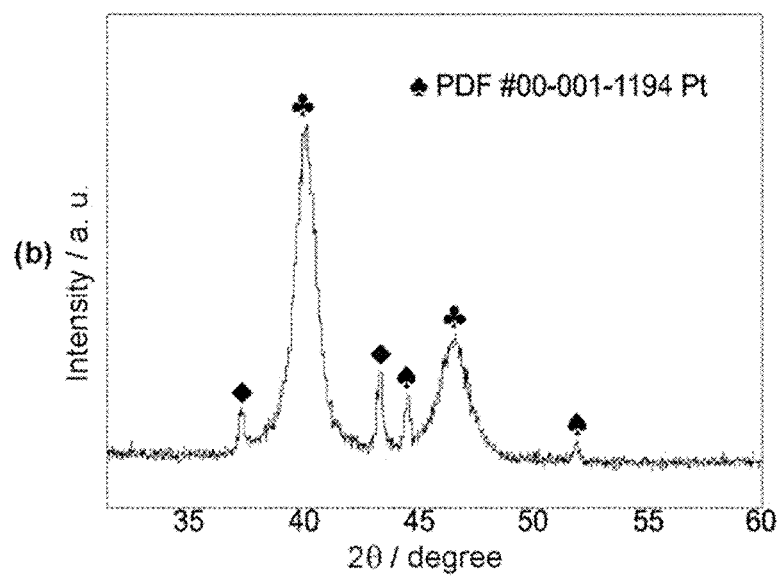
FIG. 11 is a view illustrating an XRD measurement result of the Ni@Pt adsorption member of manufacturing example 2 according to experimental example 2.

According to FIG. 11, from the XRD measurement results on the Ni@Pt adsorption member, peaks of platinum could be confirmed, and thus, it could be confirmed that platinum was coated on the adsorption member.

Figure 12:
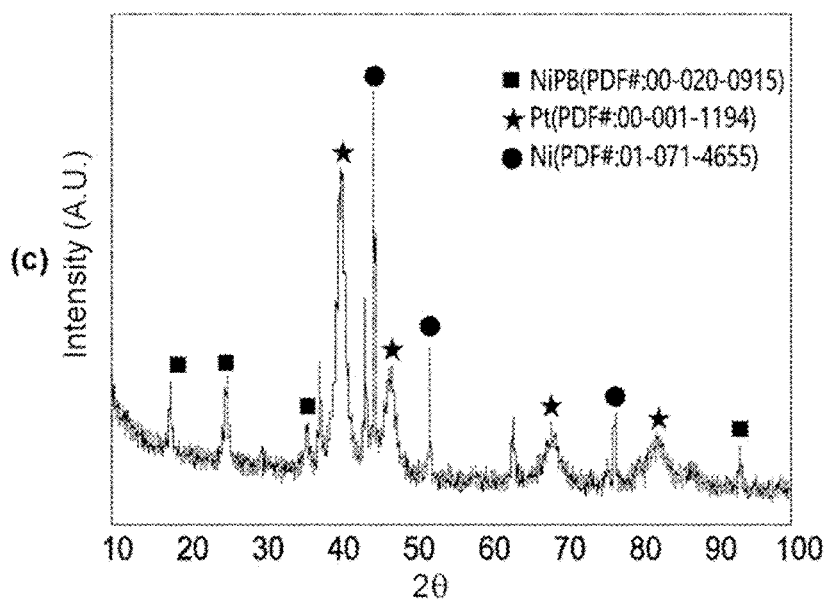
FIG. 12 is a view illustrating an XRD measurement result of the Ni@PB/Pt adsorption member of manufacturing example 5 according to experimental example 2.

According to FIG. 12, from the XRD measurement results on the Ni@PB/Pt adsorption member, peaks of nickel, platinum, Prussian blue could be confirmed, and thus, it could be confirmed that platinum and Prussian blue were coated on the nickel surface of the adsorption member.

Figure 13:
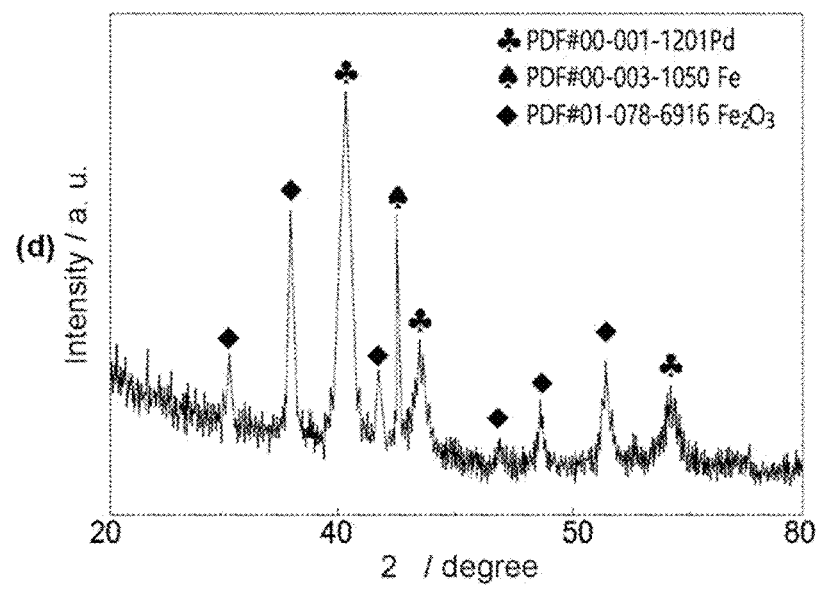
FIG. 13 is a view illustrating an XRD measurement result of the Fe@Pd adsorption member of manufacturing example 4 according to experimental example 2.

According to FIG. 13, from the XRD measurement results on the Fe@Pd adsorption member, peaks of iron, palladium, and iron oxide could be confirmed, and thus, it could be confirmed that platinum was coated on the adsorption member.

Experimental Example 3. Evaluation of Adsorption of Adsorption Member of Manufacturing Example 1

Figure 14:
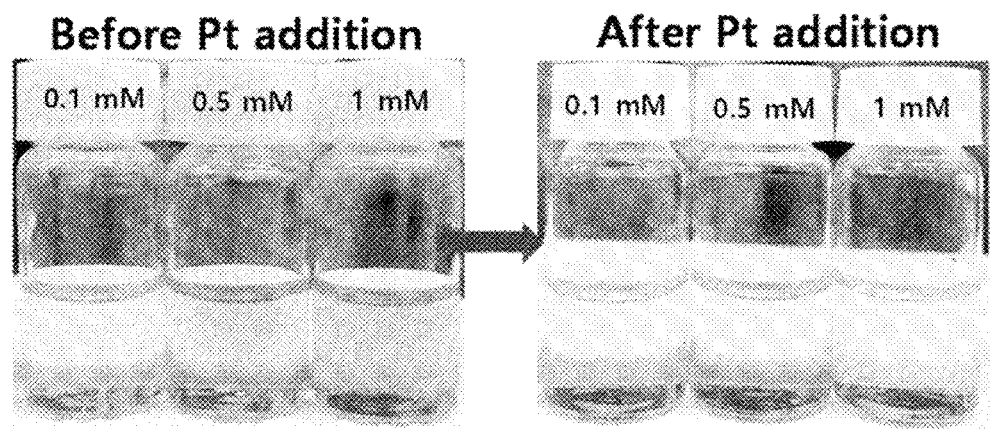
FIG. 14 is a view illustrating a result of confirming whether the Fe@Pd adsorption member of manufacturing example 1 adsorbs iodine according to experimental example 3.

A solution in which iodine was dissolved in a concentration of about 0.1 mM, 0.5 mM, and 1 mM was prepared, the Fe@Pt adsorption member of manufacturing example 1 was then added and whether adsorption was performed was confirmed, and the results thereof were illustrated in FIG. 14.

According to FIG. 14, it could be confirmed that the higher the concentration of iodine before adding the adsorption member, the thicker the color of an aqueous solution became.

Subsequently, it could be confirmed that after adding the adsorption member of manufacturing example 1, the color of the solution disappeared and became transparent. That is, it could be confirmed that iodine was adsorbed to platinum (Pt).

Experimental Example 4. Evaluation of UV-Visible Spectroscopy of the Adsorption Members of Manufacturing Examples 1 to 5

Figure 15:
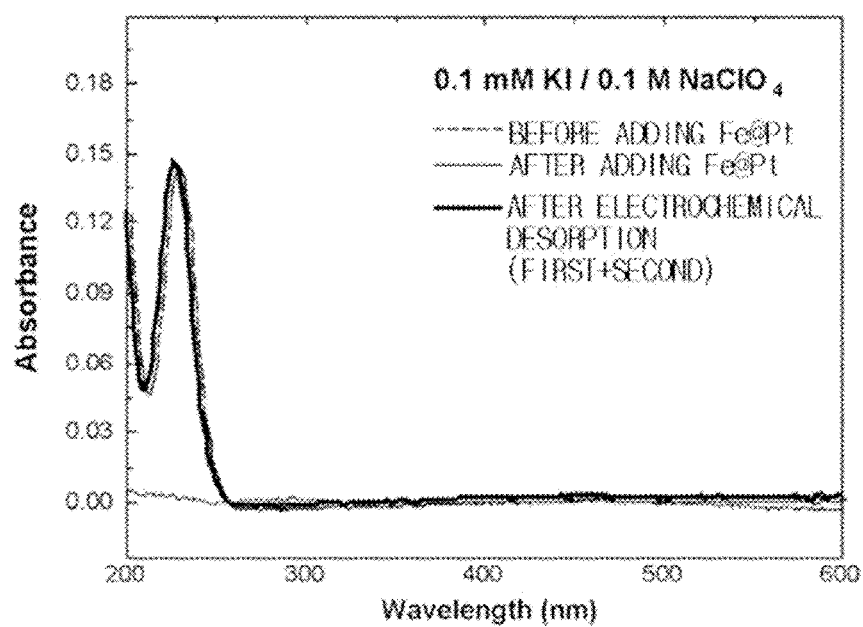
FIG. 15 is a view illustrating a measurement result of UV-Visible spectroscopy before and after adsorption of the Fe@Pt adsorption member manufacturing example 1 in a 0.1 mM KI/0.1 M $NaClO_4$ solution according to experimental example 4.
Figure 16:
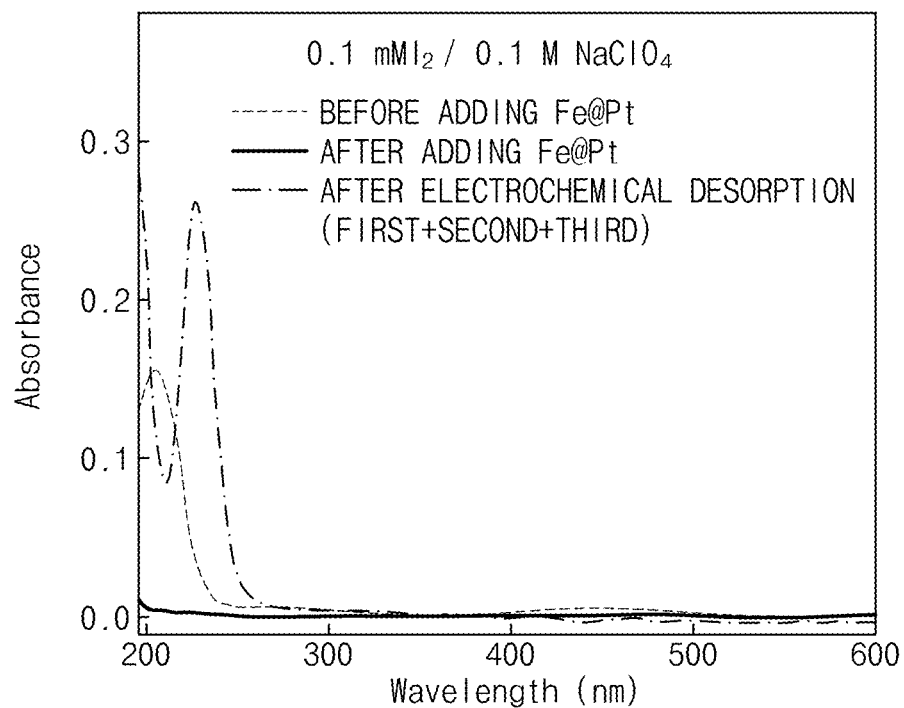
FIG. 16 is a view illustrating a measurement result of UV-Visible spectroscopy before and after adsorption of the Fe@Pt adsorption member of manufacturing example 1 in a 0.1 mM $I_2$/0.1 M $NaClO_4$ solution according to experimental example 4.

1) The adsorption member of manufacturing example 1 was added to an about 0.1 mM KI/about 0.1 M $NaClO_4$ solution and an about 0.1 mM $I_2$/about 0.1 M $NaClO_4$ solution, UV-visible spectroscopy measurement results before/after the addition were respectively illustrated in FIGS. 15 and 16, and the measurement results of inductively coupled plasma (ICP) after two times of adsorption/desorption on the adsorption member of manufacturing example 1 were illustrated in Table 1 below.

TABLE 1

|  | 0.1 mM KI/ 0.1M NaClO$_4$ | 0.1 mM I$_2$/ 0.1M NaClO$_4$ |
|---|---|---|
| Before adding Fe@Pt adsorbent | — | — |
| Iodine recovery rate after electrochemical desorption (first + second) | 97.8% | 98.0% |

According to FIG. 15, it could be confirmed that in an aqueous solution containing KI, peaks were observed between about 200-250 nm which was adsorption wavelengths of iodine compounds before adding the Fe@Pt radioactive chemical waste adsorption member of manufacturing example 1, and confirmed that the peaks of the iodine compounds were not observed after adding the Fe@Pt radioactive chemical waste adsorption member and iodine was adsorbed.

Subsequently, the Fe@Pt radioactive chemical waste adsorption member that has adsorbed iodine was desorbed using a three-electrode system, and then UV-visible spectroscopy was measured, and from the results thereof, it could be firmed that peaks of iodine was observed again. Accordingly, it could be confirmed that the iodine adsorbed to the Fe@Pt radioactive chemical waste adsorption member was desorbed and dissociated from the adsorption member through electrochemical desorption.

In addition, according to Table 1, it could be confirmed that a very high recovery rate of iodine of about 97.8% was exhibited after repeating the electrochemical desorption two times (two times of adsorption/desorption). Accordingly, it could be confirmed that even when the Fe@Pt radioactive chemical waste adsorption member was repeatedly used, the adsorption of iodine was performed and the adsorption member was reusable.

According to FIG. 16, it could be confirmed that in an aqueous solution containing 12, peaks of iodine compounds were observed before adding the Fe@Pt radioactive chemical waste adsorption member of manufacturing example 1, and confirmed that the peaks of the iodine compounds were not observed after adding the Fe@Pt radioactive chemical waste adsorption member and iodine was adsorbed. In addition, it could be confirmed that peaks of iodine were observed again after desorption, so that it could be confirmed that the Fe@Pt radioactive chemical waste adsorbent stably adsorbed and desorbed iodine even when the chemical type of iodine was changed.

In addition, according to Table 1, it could be confirmed that the very high recovery rate of iodine of about 98% was exhibited even after repeating the electrochemical desorption two time, so that it could be confirmed that the adsorbent was usable and reusable even when the chemical type of iodine was changed.

Figure 17:
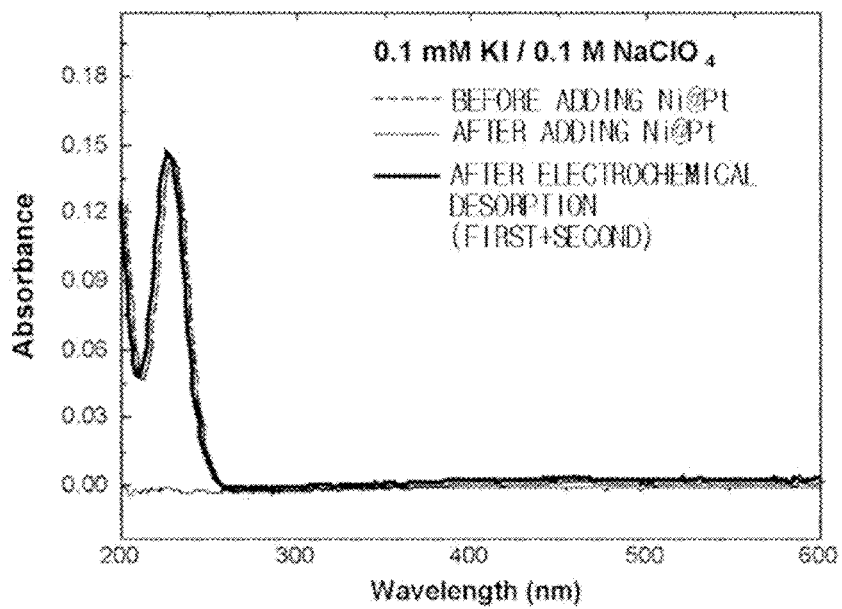
FIG. 17 is a view illustrating a measurement result of UV-Visible spectroscopy before and after adsorption of the Ni@Pt adsorption member of manufacturing example 2 in a 0.1 mM KI/0.1 M $NaClO_4$ solution according to experimental example 4.
Figure 18:
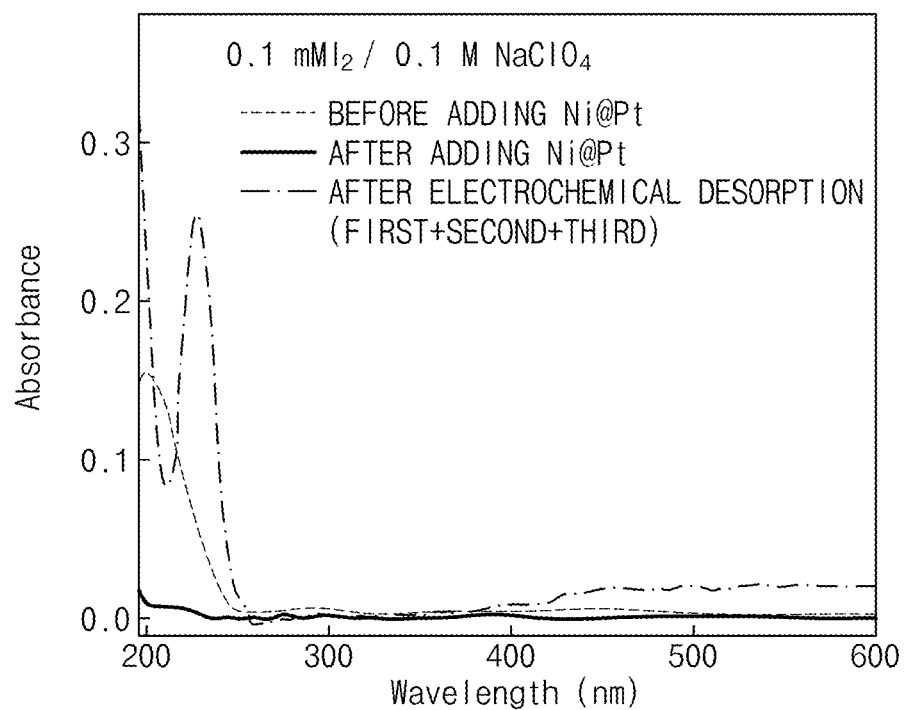
FIG. 18 is a view illustrating a measurement result of UV-Visible spectroscopy before and after adsorption of the Ni@Pt adsorption member of manufacturing example 2 in a 0.1 mM $I_2$/0.1 M $NaClO_4$ solution according to experimental example 4.

2) The Ni@Pt adsorption member of manufacturing example 2 was added to a solution of about 0.1 mM KI/about 0.1 M NaClO$_4$ and a solution of about 0.1 mM 12/about 0.1 M NaClO$_4$, and UV-visible spectroscopy measurement results before/after the addition were respectively illustrated in FIGS. 17 and 18.

According to FIG. 17, it could be confirmed that in an aqueous solution containing KI, peaks of iodine compounds were observed before adding the Ni@Pt radioactive chemical waste adsorption member of manufacturing example 2, and confirmed that peaks of the iodine compounds were not observed after adding the Ni@Pt radioactive chemical waste adsorption member and iodine was adsorbed.

In addition, the Ni@Pt radioactive chemical waste adsorption member that has adsorbed iodine was desorbed using a three-electrode system, and then UV-visible spectroscopy was measured, and from the results thereof, it could be firmed that peaks of iodine was observed again. Accordingly, it could be confirmed that the iodine adsorbed to the Fe@Pt radioactive chemical waste adsorption member was desorbed and dissociated from the adsorption member through electrochemical desorption.

According to FIG. 18, it could be confirmed that in an aqueous solution containing 12, peaks of iodine compounds were observed before adding the Ni@Pt radioactive chemical waste adsorption member of manufacturing example 2, and confirmed that peaks of the iodine compounds were not observed after adding the Ni@Pt radioactive chemical waste adsorption member and iodine was adsorbed. In addition, it could be confirmed that peaks of iodine were observed again after desorption, so that it could be confirmed that the Ni@Pt radioactive chemical waste adsorbent stably adsorbed and desorbed iodine even when the chemical type of iodine was changed.

Figure 19:
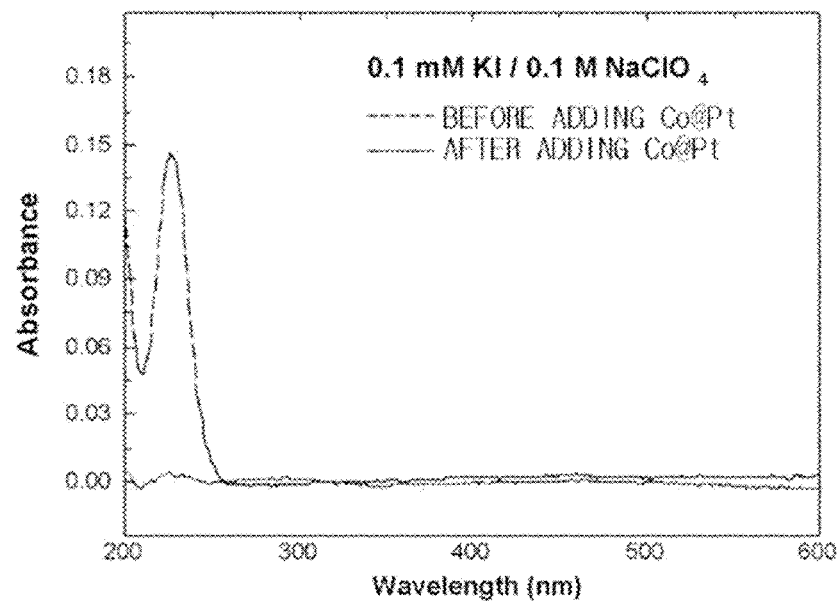
FIG. 19 is a view illustrating a measurement result of UV-Visible spectroscopy before and after adsorption of the Co@Pt adsorption member manufacturing example 3 in a 0.1 mM KI/0.1 M $NaClO_4$ solution according to experimental example 4.

3) 2) The Co@Pt adsorption member of manufacturing example 3 was added to a solution of about 0.1 mM KI/about 0.1 M NaClO$_4$, and UV-visible spectroscopy measurement results before/after the addition were illustrated in FIG. 19.

According to FIG. 19, it could be confirmed that in an aqueous solution containing KI, peaks of iodine compounds were observed before adding the Co@Pt radioactive chemical waste adsorption member of manufacturing example 3, and confirmed that peaks of the iodine compounds were not observed after adding the Co@Pt radioactive chemical waste adsorption member and iodine was adsorbed.

Figure 20:
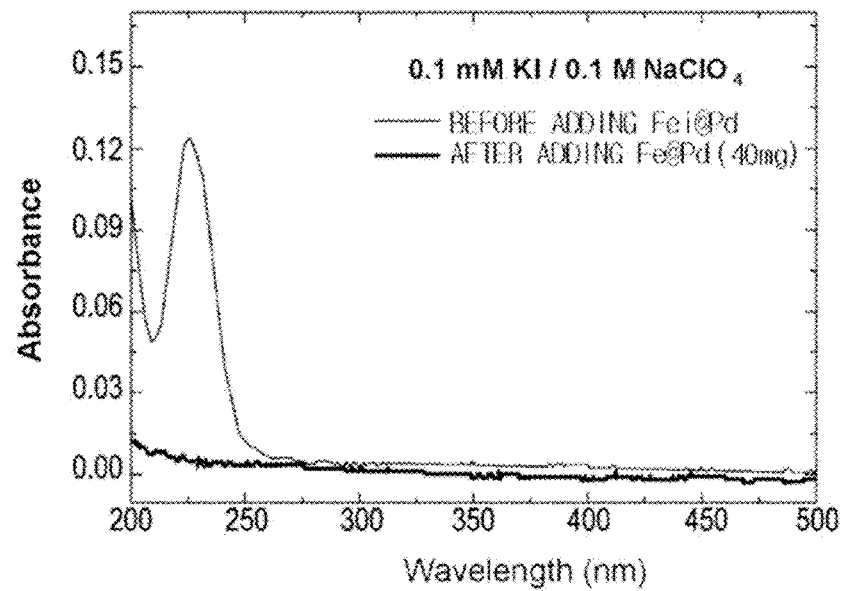
FIG. 20 is a view illustrating a measurement result of UV-Visible spectroscopy before and after adsorption of the Fe@Pd adsorption member of manufacturing example 4 in a 0.1 mM KI/0.1 M $NaClO_4$ solution according to experimental example 4.

4) The Fe@Pd adsorption member of manufacturing example 4 was added to a solution of about 0.1 mM KI/about 0.1 M NaClO$_4$, and UV-visible spectroscopy measurement results before/after the addition were illustrated in FIG. 20.

According to FIG. 20, it could be confirmed that in an aqueous solution containing KI, peaks of iodine compounds were observed before adding the Fe@Pd radioactive chemical waste adsorption member of manufacturing example 4, and confirmed that peaks of the iodine compounds were not observed after adding the Fe@Pd radioactive chemical waste adsorption member and iodine was adsorbed.

Figure 21:
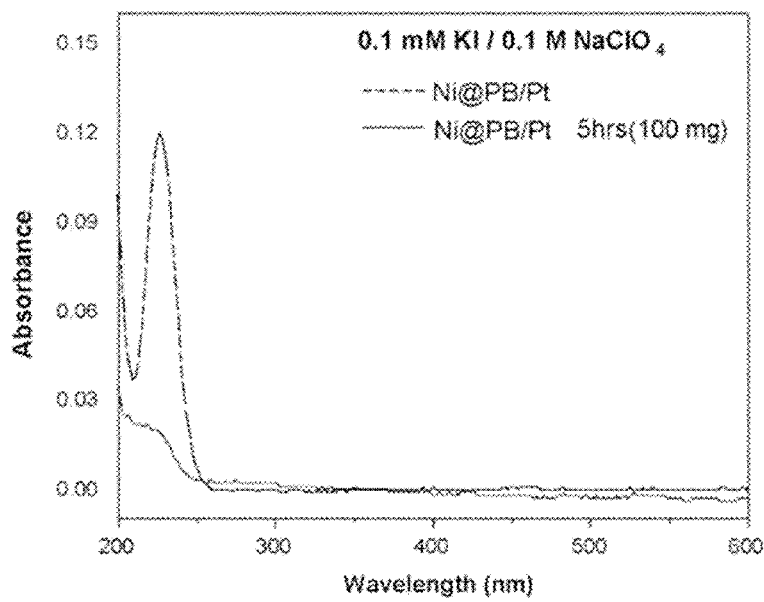
FIG. 21 is a view illustrating a measurement result of UV-Visible spectroscopy before and after adsorption of the Ni@PB/Pt adsorption member of manufacturing example 5 in a 0.1 mM KI/0.1 M $NaClO_4$ solution according to experimental example 4.

5) The Ni@PB/Pd adsorption member of manufacturing example 5 was added to a solution of about 0.1 mM CsI/about 0.1 M NaClO$_4$, and UV-visible spectroscopy measurement results before/after the addition were illustrated in FIG. 21.

According to FIG. 21, it could be confirmed that from the results of UV-visible spectroscopy measurement on an aqueous solution containing about 0.1 mM CsL, peaks were observed between adsorption wavelengths of about 200-250 nm, and confirmed that peaks became small after adding the Ni@PB/Pd adsorption member of manufacturing example 5 and the concentration of CsI decreased in the aqueous solution. That is, it could be confirmed that it was possible to absorb cesium and iodine together by using the Ni@PB/Pd radioactive chemical waste adsorption member.

Experimental Example 5. Evaluation of Desorption Rate after Repeating Adsorption/Desorption Experiments on Adsorption Member of Manufacturing Example 1

Figure 22:
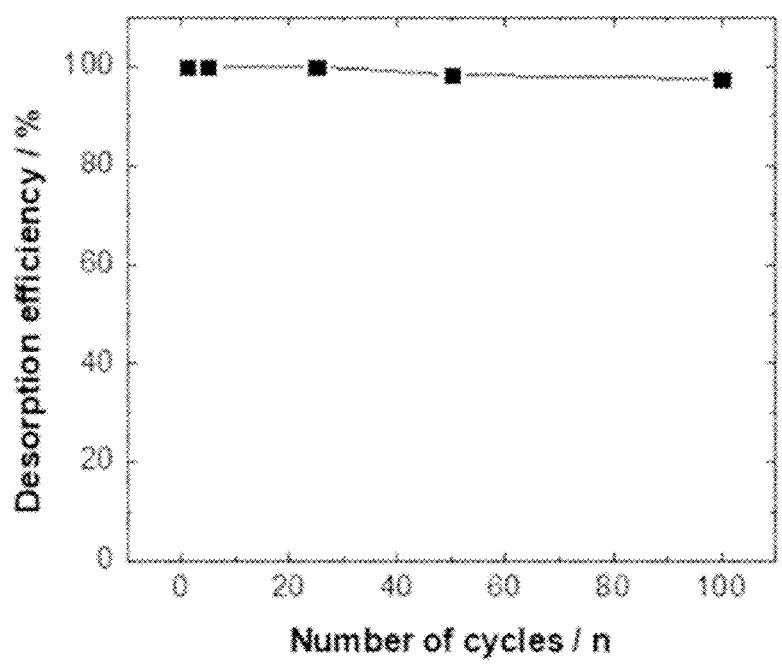
FIG. 22 is a view illustrating a result of measuring adsorption/desorption rate after repeated adsorption/desorption experiments using the Fe@Pt adsorption member of manufacturing example 1 after sintering according to experimental example 5.

FIG. 22 illustrates the results of measuring desorption rate by repeating adsorption/desorption experiments on iodide (I−) about 100 times in an about 0.1 mM KI/about 0.1 M NaClO$_4$ solution using the Fe@Pt adsorption member of manufacturing example 1 obtained by sintering at about 200° C.

According to FIG. 22, it could be confirmed that even when adsorption/desorption experiments were repeated about 100 times on the Fe@Pt radioactive chemical waste adsorption member of manufacturing example 1 and the adsorption member was reused, the adsorption/desorption rate was about 97% or more, and thus it could be confirmed that even when the radioactive chemical waste adsorption member was repeatedly reused, the adsorption and desorption function were maintained.

Experimental Example 6. Adsorption and Electrochemical Desorption of Iodine

An iodine ion non-attached platinum electrode was immersed in an aqueous solution of about 0.1 M NaClO$_4$ as an adsorption member, vitreous carbon was immersed as a counter electrode, and an Ag|AgCl electrode was immersed as a reference electrode, and thus, a electrochemical three-electrode cell was constructed. In this cell, a linear sweep voltammetry experiment was performed at a scan speed of about 50 mV/s from about 0 V to about −0.9 V. The platinum electrode was taken out of the electrochemical cell and put into an excessive amount of water (about 100 mL) in which about 0.001 mM of iodine compounds such as KI, 12 and CH$_3$I were dissolved, and then was stirred for about 30 minutes. Subsequently, the platinum electrode was recovered and immersed into the electrochemical cell, and a linear sweep voltammetry was performed, and the results thereof were illustrated in FIG. 23.

Figure 23:
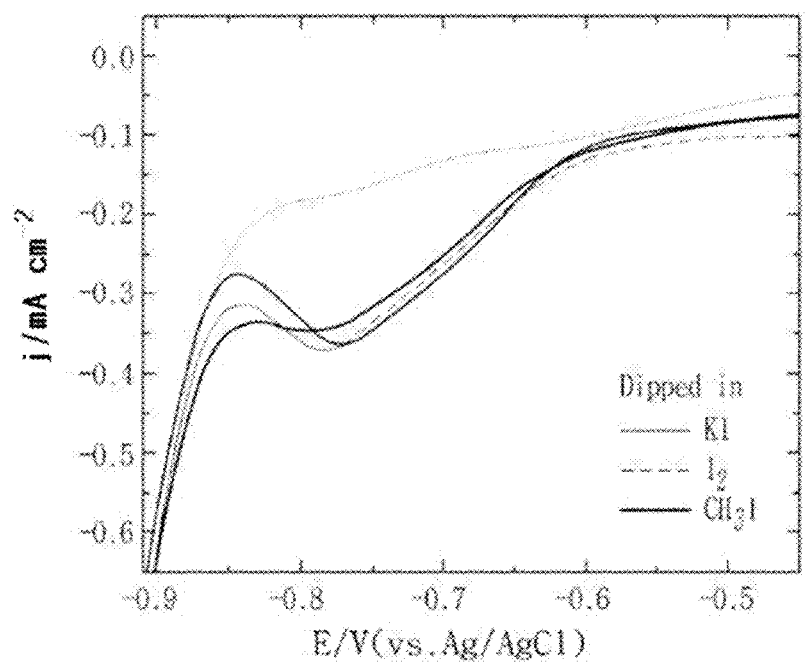
FIG. 23 is a view illustrating an experimental result of a linear sweeping voltage current experiment according to whether to adsorb an iodine compound according to experimental example 6.

According to FIG. 23, it could be confirmed that a background level current flows in the results when the platinum electrode was not immersed in the iodine compound solution, whereas in the electrode to which iodine was adsorbed, a reduction current flows between about −0.6 V and about −0.85 V. The current flowed because the iodine adsorbed to the surface of the platinum electrode was dissociated into iodine ions through a reaction like the reaction formula 1 below. This means that when an iodine compound is adsorbed to the surface of the platinum electrode, the iodine ions are reduced and dissociated into an electrolyte when a potential greater more negative than about −0.6V is applied.

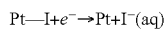   [Reaction formula 1]

Experimental Example 7. Adsorption and Dissociation Reactions of Cesium Ion (Cs+) of Prussian Blue According to Electrochemical Potential A vitreous carbon electrode coated with a nickel Prussian blue adsorption member was immersed in a solution in which CsNO3 was dissolved to form a three-electrode electrochemical apparatus with the carbon electrode serving as a working electrode, and then a cyclic voltammetry experiments was performed, and the results thereof were illustrated in FIG. 24.

Figure 24:
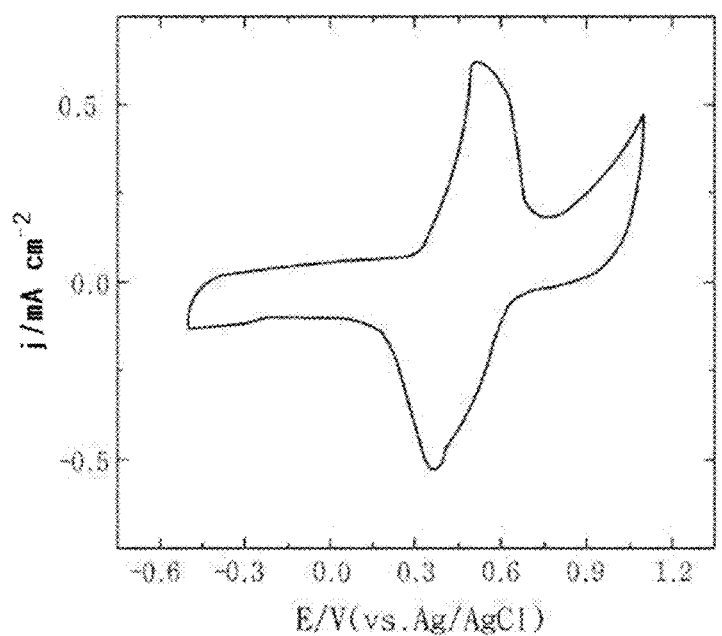
FIG. 24 is a view illustrating a circulation voltage and current experimental result according to adsorption and dissociation of cesium ($Cs+$) ions using a nickel Prussian blue adsorption member according to experimental example 7.

According to FIG. 24, it could be confirmed that a redox current flow was observed with respect to about +0.45 V. This is a current generated while the iron ions of the Prussian blue are oxidized and reduced as illustrated in reaction formula 2 below. In this process, a cesium ion (Cs+) infiltrates into the Prussian blue as a counter ion.

That is, at a more negative potential than about +0.45 V, the Cs+ ion infiltrates into the Prussian blue, and at a more positive potential than about +0.45 V, the Cs+ ion is dissociated.

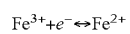   [Reaction formula 2]

Experimental Example 8. Adsorption and Desorption Reactions of Cesium Ion (Cs+) Using Prussian Blue As in experimental example 7, a vitreous carbon electrode coated with a nickel Prussian blue adsorption member was immersed in a solution in which CsNO$_3$ was dissolved to form a three-electrode electrochemical apparatus with the carbon electrode serving as a working electrode, and then a potential no greater than about +0.45 V was applied to adsorb a Cs$^+$ ion to the nickel Prussian blue adsorption member. Subsequently, the vitreous carbon electrode was removed from an electrochemical cell and washed with distilled water several times.

Figure 25:
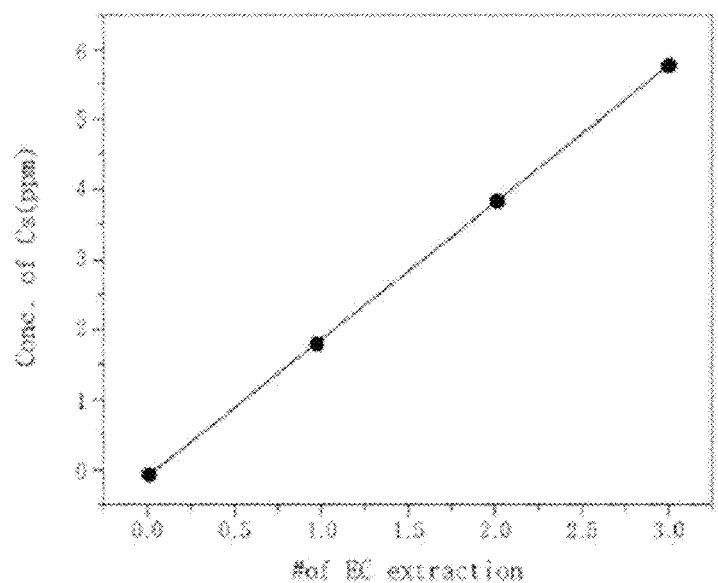
FIG. 25 is a view illustrating a measurement result of a cesium concentration according to electrochemical recovery of cesium ions using a carbon electrode coated with nickel Prussian blue according to experimental example 8.

In addition, another three-electrode electromechanical apparatus was constructed with the vitreous carbon electrode serving as a working electrode and coated with a nickel Prussian blue adsorption member to which the Cs+ ion was adsorbed, then a potential of at least about +0.45 V was applied to dissociate the Cs$^+$ ion, the Cs$^+$ concentration of a solution containing the dissociated Cs$^+$ ion was measured by using an inductively coupled plasma-atomic emission spectrometer (ICP-AES), and the concentration graph of the cesium was illustrated in FIG. 25 according to electrochemical recovery of cesium using the Prussian blue-coated vitreous carbon electrode.

According to FIG. 25, it could be confirmed that electrochemical recovery process of Cs$^+$ was repeatedly performed 1, 2, and 3 times using the Prussian blue adsorption member-coated vitreous carbon electrode, so that not only the Cs$^+$ ions may be moved from a large container to a small container, but also the low concentration of Cs$^+$ ions may be concentrated in a small volume. That is, it could be confirmed that in order to adsorb and concentrate the Cs$^+$ ions in a great amount of radioactive chemical waste-containing fluid, the Prussian blue could be used as a reusable radioactive chemical waste adsorption member.

Experimental Example 9. Removal of Radioactive Chemical Wastes Using Radioactive Chemical Waste Treatment Apparatus An excessive amount of water (waste fluid of about 18 L) I which about 14 ppm of I$_2$ was dissolved was injected into a first accommodation part of the radioactive chemical waste treatment apparatus including the Fe@Pt adsorption member of manufacturing example 1, then was stirred for about 2 hours, and then iodine was adsorbed to the Fe@Pt adsorption member.

Figure 26:
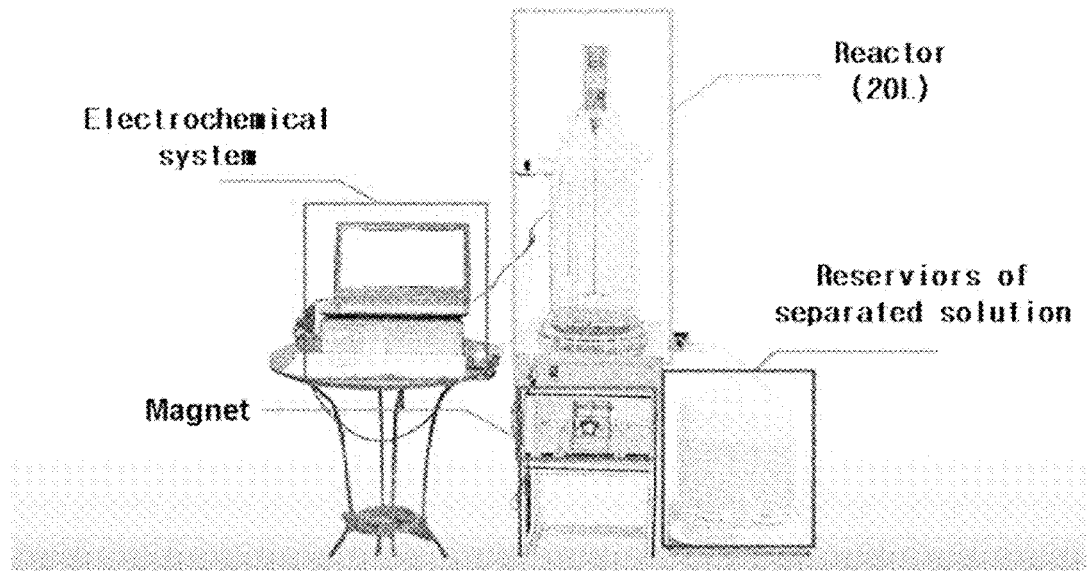
FIG. 26 is a view schematically illustrating a manufactured radioactive chemical waste treatment apparatus according to experimental example 9.

Subsequently, as illustrated in FIG. 26, a magnet installed in a lower portion was raised and the Fe@Pt adsorption member was fixed to a working electrode on the lower magnet side from a solution.

After discharging iodine-removed fluid (treated fluid), a potential was applied to the Fe@Pt adsorption member adhering to the working electrode to thereby dissociate and concentrate the iodine adsorbed to the Fe@Pt adsorption member into a small amount of remaining fluid in the treatment apparatus, and the fluid (concentrated fluid) in which iodine was concentrated was recovered.

Figure 27:
FIG. 27 is a view illustrating an image of treated fluid and concentrated fluid recovered after adsorption/desorption experiment according to experimental example 9.

FIG. 27 is an image after adding a small amount of hydrochloric acid and peroxide into treated fluid (marked as "after desorption") and concentrated fluid (marked as "after desorption") according to experimental example 9.

Accordingly, it could be confirmed that iodine dissolved in a great volume of fluid could be removed with high efficiency using the apparatus and method for treating radioactive chemical wastes according to the present invention, and be concentrated into a small amount of solution. In addition, it could be confirmed that from the result of measuring the concentration before and after iodine adsorption (removal) using a mass analyzer, about 99.8% of about 14 ppm of iodine dissolved in a great amount of aqueous solution could be removed by using this system.

Experimental Example 10. Removal of Radioactive Chemical Wastes Using Radioactive Chemical Waste Treatment Apparatus FIG. 28 is an image in which a radioactive chemical waste treatment apparatus according to an embodiment of the present invention is manufactured.

Figure 28:
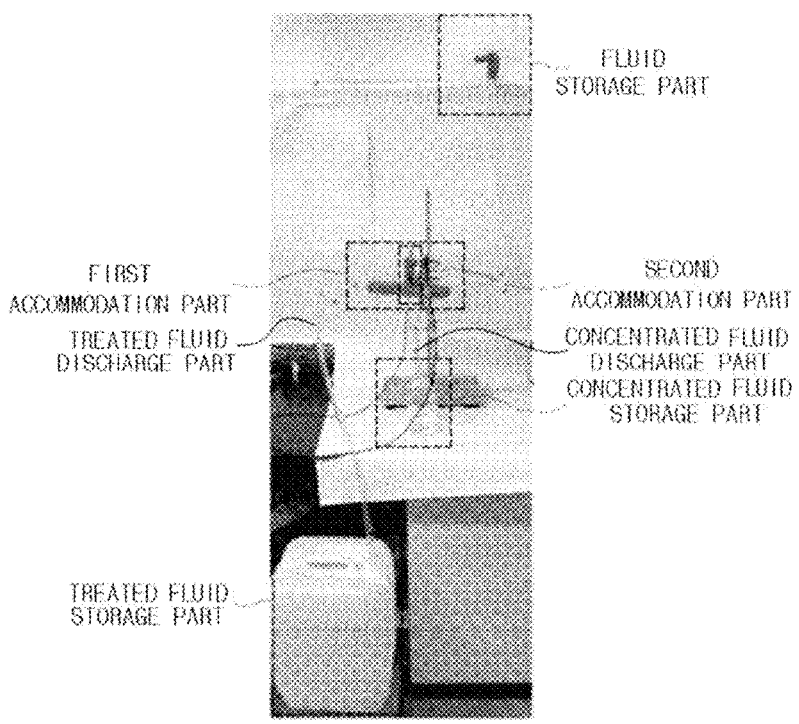
FIG. 28 is a view illustrating a manufactured radioactive chemical waste treatment apparatus according to experimental example 10.

In order to remove radioactive chemical wastes using the radioactive chemical waste treatment apparatus of FIG. 28, radioactive iodine-containing fluid stored in a waste water storage part (fluid storage part) was injected into a first accommodation part including a platinum-coated net adsorption member, and then the radioactive iodine-removed treated fluid was recovered through a treated fluid discharge part.

At this point, since a porous membrane was provided between the fluid storage part and the first accommodation part, the radioactive iodine-containing fluid passes through the porous membrane and filters impurities contained in the radioactive iodine-containing fluid while injected into the first accommodation part, and the fluid formed a turbulent while passing through the porous membrane, and thus, there was exhibited an effect of stirring with a stirred as the fluid forms a turbulent flow. Subsequently, the radioactive iodine containing-fluid stored in the fluid storage part was all injected into the first accommodation part to adsorb the radioactive iodine to the adsorption member, then an extra treated fluid was remained in the adsorption member so that the adsorption member could be immersed, a counter electrode and a reference electrode were connected to apply a potential was to a working electrode with the adsorption member serving as a working electrode, and thus, while the iodine adsorbed to the adsorption member was dissociated and concentrated into the extra treated fluid, the iodine-concentrated concentrated water was finally discharged to the outside and the adsorption member was regenerated.

Experimental Example 11. Monitoring of Radioactive Chemical Waste Treatment Apparatus A three-electrode system was constructed by using a platinum electrode as a working electrode in an electrolyte without iodine. An about 4 wt % of boric acid which was cooling water for a nuclear power plant was used as an electrolyte, and the results of measuring an open circuit potential while adding an iodine solution ($I_2$ or $I^-$) into the electrolyte was illustrated in FIG. 29.

Figure 29:
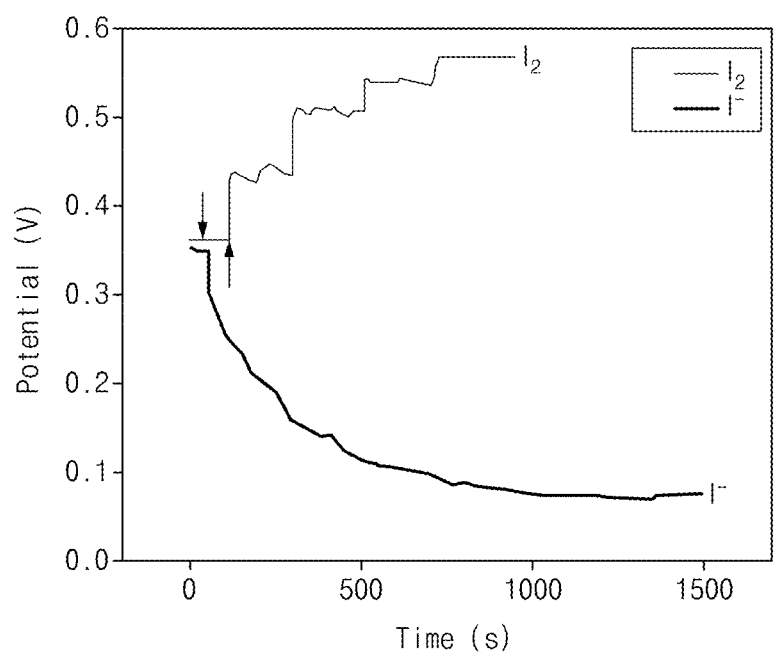
FIG. 29 is a view illustrating a measurement result of a potential according to an iodine concentration in a radioactive chemical waste treatment apparatus according to experimental example 11.

According to FIG. 29, it could be confirmed that an initial open circuit potential maintained about +0.35 V, and as soon as adding iodine ($I_2$) or an iodide ($I^-$), the potential value abruptly varied.

In addition, it could be confirmed that when adding the iodine solution ($I_2$), the potential value abruptly increased and was stabilized at about 0.55 V, and that when adding an iodide ($I^-$), the potential value was stabilized at about 0.08 V.

That is, it could be confirmed that as iodine was adsorbed, the open circuit potential abruptly varied, and accordingly, whether radioactive chemical wastes (for example, iodine etc.) in the radioactive chemical waste treatment apparatus of the present invention could be directly monitored.

What is claimed is:

1. A radioactive chemical waste treatment apparatus comprising:
   an adsorption unit comprising a radioactive chemical waste adsorption member for adsorbing and separating radioactive chemical wastes from a radioactive chemical waste-containing fluid; and
   a regeneration unit which is in fluidic communication with the adsorption unit and is for regenerating the radioactive chemical waste adsorption member by desorbing the radioactive chemical wastes from the adsorption member with the radioactive chemical wastes adsorbed thereonto,
   wherein the radioactive chemical wastes comprise radioactive iodine,
   the radioactive iodine comprises at least one selected from the group consisting of $I^-$, $I_2$ and $CH_3I$,
   wherein the radioactive chemical waste adsorption member comprises a support and an adsorbent, and
   wherein the adsorbent comprises at least one selected from platinum (Pt), palladium (Pd), ruthenium (Ru), osmium (Os), rhodium (Rh), iridium (Ir), and an alloy thereof.

2. The radioactive chemical waste treatment apparatus of claim 1, wherein
   the adsorbent is mixed or dispersed in the support, or contained in at least a portion of the surface of the support.

3. The radioactive chemical waste treatment apparatus of claim 2, wherein
   the support has at least one shape selected from a mesh shape and a nanoparticle shape, and
   the support comprises at least one selected from iron, magnetite, nickel, cobalt, an alloy thereof, and an oxide thereof.

4. The radioactive chemical waste treatment apparatus of claim 1, wherein the radioactive chemical wastes further comprise radioactive cesium, and the adsorbent further comprises Prussian blue.

5. The radioactive chemical waste treatment apparatus of claim 1, wherein the radioactive chemical waste adsorption member is sintered at 50° C. to 900° C. and is then washed and dealloyed with at least one solution selected from a Piranha solution, nitric acid, sulfuric acid, and hydrochloric acid.

6. The radioactive chemical waste treatment apparatus of claim 1, further comprising a magnetic substrate for fixing the radioactive chemical waste adsorption member inside the adsorption unit.

7. The radioactive chemical waste treatment apparatus of claim 1, wherein the regeneration unit comprises a desorption member for desorbing the radioactive chemical wastes from the radioactive chemical waste adsorption member with the radioactive chemical wastes adsorbed thereonto while electrochemically reacting with the radioactive chemical wastes.

8. The radioactive chemical waste treatment apparatus of claim 7, wherein the desorption member comprises a three-electrode system with the radioactive chemical waste adsorption member serving as a working electrode.

9. The radioactive chemical waste treatment apparatus of claim 1, wherein the regeneration unit further comprises a first separation membrane unit for preventing inflow of the radioactive chemical wastes desorbed from the radioactive chemical waste adsorption member in the adsorption unit.

10. The radioactive chemical waste treatment apparatus of claim 1, wherein the adsorption unit further comprises a second separation membrane unit for preventing inflow of contaminants in the radioactive chemical waste-containing fluid.

* * * * *